US012546142B2

(12) United States Patent
Roatis et al.

(10) Patent No.: US 12,546,142 B2
(45) Date of Patent: Feb. 10, 2026

(54) LOCK

(71) Applicant: TriTeq Lock and Security, LLC, Elk Grove Village, IL (US)

(72) Inventors: Calin Roatis, Long Grove, IL (US); William Denison, North Barrington, IL (US)

(73) Assignee: TriTeq Lock and Security, LLC, Elk Grove Village, IL (US)

( * ) Notice: Subject to any disclaimer, the term of this patent is extended or adjusted under 35 U.S.C. 154(b) by 0 days.

(21) Appl. No.: 18/212,095

(22) Filed: Jun. 20, 2023

(65) Prior Publication Data

US 2024/0093533 A1 Mar. 21, 2024

Related U.S. Application Data

(63) Continuation of application No. 17/001,439, filed on Aug. 24, 2020, now Pat. No. 11,680,424, which is a (Continued)

(51) Int. Cl.

| | |
|---|---|
| ***E05B 47/06*** | (2006.01) |
| ***E05B 1/00*** | (2006.01) |
| ***E05B 15/00*** | (2006.01) |
| ***E05B 47/00*** | (2006.01) |
| ***E05C 3/12*** | (2006.01) |

(52) U.S. Cl.

CPC .......... *E05B 47/0673* (2013.01); *E05B 1/003* (2013.01); *E05B 15/0053* (2013.01); *E05B 47/0001* (2013.01); *E05B 47/0012* (2013.01); *E05B 47/0603* (2013.01); *E05B 47/063* (2013.01); *E05B 47/0657* (2013.01); (Continued)

(58) Field of Classification Search

CPC ............. E05B 47/0012; E05B 47/0657; E05B 47/0661; E05B 47/0665; E05B 47/0673; E05B 2047/0024; E05B 2047/0025; E05C 3/12

See application file for complete search history.

(56) References Cited

U.S. PATENT DOCUMENTS 4,148,092 A * 4/1979 Martin ............... G07C 9/00904 70/268

5,058,404 A * 10/1991 Fish ........................ E05B 37/16 70/315

(Continued)

*Primary Examiner* — Christopher J Boswell

(74) *Attorney, Agent, or Firm* — Charles T. Riggs, Jr.

(57) ABSTRACT

A lock includes a housing assembly, an actuatable lock assembly and a latching assembly. The actuatable lock assembly is positionable in at least a closed orientation and an open orientation. The latching assembly further includes a latch, a cam and a motor. The latch, having a cam profile, is movable between a locked position and an unlocked position. In the locked position, the actuatable lock assembly is maintained in the closed orientation. In the unlocked position, the actuatable lock assembly is positionable into an open orientation. The cam is rotatably mounted and has a first follower configured to intermittently coact with the cam profile of the latch, to, in turn, move the latch between the locked position and the unlocked position. The motor is coupled to the cam. Actuation of the motor causes rotation of the cam, resulting in movement of the latch between the locked and unlocked positions.

32 Claims, 43 Drawing Sheets

Related U.S. Application Data continuation of application No. 15/082,019, filed on Mar. 28, 2016, now Pat. No. 10,753,123, which is a continuation of application No. 14/719,218, filed on May 21, 2015, now Pat. No. 10,273,715, which is a continuation of application No. PCT/US2014/038016, filed on May 14, 2014.

(60) Provisional application No. 61/823,685, filed on May 15, 2013.

(52) U.S. Cl.
CPC ........ *E05C 3/12* (2013.01); *E05B 2047/0024* (2013.01); *E05B 2047/0025* (2013.01)

(56) References Cited

U.S. PATENT DOCUMENTS

| | | | | | |
|---|---|---|---|---|---|
| 5,265,452 | A * | 11/1993 | Dawson | E05B 17/042 | 70/277 |
| 5,437,174 | A * | 8/1995 | Aydin | G07C 9/00944 | 70/423 |
| 5,816,083 | A * | 10/1998 | Bianco | E05B 39/00 | 70/462 |
| 6,079,238 | A * | 6/2000 | Hoffmann | E05B 47/0673 | 70/283 |
| 6,286,347 | B1 * | 9/2001 | Frolov | E05B 47/0692 | 70/277 |
| 6,725,693 | B2 * | 4/2004 | Yu | E05B 47/068 | 292/144 |
| 7,007,526 | B2 * | 3/2006 | Frolov | E05B 47/068 | 70/277 |
| 7,439,850 | B2 * | 10/2008 | Boulard | E05B 13/004 | 340/426.36 |
| 7,870,770 | B2 * | 1/2011 | Blanch | E05B 13/004 | 70/279.1 |
| 8,495,898 | B2 * | 7/2013 | Gokcebay | G07C 9/00666 | 70/214 |
| 8,555,685 | B2 * | 10/2013 | Frolov | E05B 63/16 | 70/482 |
| 8,616,031 | B2 * | 12/2013 | Ullrich | E05B 47/0676 | 70/279.1 |
| 8,677,792 | B2 * | 3/2014 | Wheeler | E05B 17/0058 | 70/279.1 |
| 10,273,715 | B2 * | 4/2019 | Roatis | E05B 47/0012 | |
| 10,550,600 | B2 * | 2/2020 | Roatis | E05B 47/0012 | |
| 10,753,123 | B2 * | 8/2020 | Roatis | E05B 37/00 | |
| 10,909,789 | B2 * | 2/2021 | Gokcebay | E05B 63/0056 | |

* cited by examiner

LOCK

CROSS-REFERENCE TO RELATED APPLICATION

The present application is a continuation of U.S. patent application Ser. No. 17/001,439, filed Aug. 24, 2020, entitled "Lock", the entire specification of which is hereby incorporated by reference which is a continuation of U.S. patent application Ser. No. 15/082,019, filed Mar. 28, 2016, entitled "Lock", the entire specification of which is hereby incorporated by reference which is a continuation of U.S. patent application Ser. No. 14/719,218, filed May 21, 2015, entitled "Lock", the entire specification of which is hereby incorporated by reference which is a continuation of PCT Patent Application No. PCT/US2014/038016 filed May 14, 2014, entitled "Lock", the entire specification of which is hereby incorporated by reference, which claims priority from U.S. Provisional Patent Application Ser. No. 61/823,685, filed May 15, 2013, entitled "Hybrid-Electronic Core Lock", the entire specification of which is hereby incorporated by reference.

BACKGROUND OF THE DISCLOSURE

1. Field of the Disclosure

The disclosure relates in general to locks, and more particularly, to a core lock that is configured to provide electronic locking and unlocking of a lock. While not limited thereto, such a lock is well suited for use in association with furniture and cabinets, including as a retrofit to existing furniture and cabinets. Of course, the lock is not limited to such use or to such a field of use, and the foregoing is solely for purposes of example.

2. Background Art

Many cabinets, desks, and other storage applications utilize locks that include a shell mounted on the door or cabinet, and an insertable and removable lock core that plugs into the shell. The shell not only houses the core, but also attaches to a driver for accomplishing the locking and unlocking function when rotated. The lock core acts to lock the driver in place when there is no key inserted in the lock core due to lock core tumblers that protrude into the shell to restrict the lock core and driver from rotation.

When the correct key is inserted in the lock core, the protruding tumblers move with respect to the cuts in the key blade and no longer protrude into the shell and no longer restrict rotation of the lock core. As the lock core is turned by the user rotating the key, drive serves to drive a cam or locking bar to the unlocked position.

Such systems are ubiquitous, however, there are nevertheless drawbacks. For example, such systems typically have a vast number of different tumbler configurations, and corresponding keys associated with each such different tumbler configuration. As a result, a supplier must include a relatively large supply of spare locks, tumblers and keys to match those that are out in the field. Additionally, the removal and replacement of such locks (necessitated by the changing of the duty of a piece of furniture, dismissal of an employee, loss of a set of keys, etcetera) is very time consuming and labor intensive.

SUMMARY OF THE DISCLOSURE

The disclosure is directed to a lock. The lock includes a housing assembly, an actuatable lock assembly and a latching assembly. The housing assembly defines a cavity. The housing includes a body mounted to a surface of a volume to be protected. The actuatable lock assembly is associated with the housing. The actuatable lock assembly is positionable in at least a closed orientation and an open orientation. A portion of the actuatable lock assembly extends from the body of the housing. The latching assembly further comprises a cam and a motor. The cam is rotatably mounted within the cavity of the housing. The cam has a first follower configured to intermittently coact with a cam profile one of directly coupled and indirectly associated with a latch. The motor is coupled to the cam. Actuation of the motor causes rotation of the cam, to, in turn, affect movement of the latch, to allow movement of the actuatable lock assembly out of the closed orientation or to preclude movement of the actuatable lock assembly out of the closed orientation.

In some configurations, the latching assembly further includes the latch being movable relative to the housing, and having a proximal end and a distal end. The distal end is configured to interface with the actuatable lock assembly wherein movement of the actuatable lock assembly between the closed orientation and the open orientation imparts movement of the latch relative to the housing. The blocker is associated with the latch and is slidably movable between a locked position and an unlocked position. In the locked position, the blocker precludes movement of the latch to thereby preclude the direction of the actuatable lock assembly from a closed orientation to an open orientation. In the unlocked position, the blocker is slidably moved relative to the latch so as to allow the latch to move relative to the blocker, to, in turn, allow the actuatable lock assembly to move between the closed orientation and the open orientation. Additionally, the blocker has a cam profile disposed thereon. The first follower of the cam is configured to intermittently coact with the cam profile of the blocker, to, upon rotation by the motor, move the blocker to allow the latch to move between a locked position and the unlocked position.

In some configurations, the latch is one of rotatable and slidably movable relative to the housing.

In some configurations, the latch is slidably movable along a latch channel defined in the housing.

In some configurations, the blocker is slidably movable relative to the housing along a blocker channel defined in the housing.

In some configurations, the blocker channel is substantially orthogonal to the latch channel.

In some configurations, the latch is biased against the actuatable lock assembly.

In some configurations, the actuatable lock assembly further includes a knob that is positioned on a top surface of the body of the housing assembly opposite the bottom surface.

In some configurations, the knob is positionable between an open orientation and a closed orientation through at least one of rotating about an axis, translating in an up and down or right and left configuration, and movement inward and outward.

In some configurations, upon actuation of the motor, from either the locked or the unlocked position, the cam rotates through an initial arcuate distance prior to imparting a force upon the blocker to slidably move the same into the other of the locked or unlocked position.

In some configurations, the initial arcuate distance comprises approximately half of a revolution.

In some configurations, the blocker further includes a second cam profile disposed thereon. The first and second cam profiles are substantially parallel to each other defining an longitudinal channel therebetween. The cam further includes a body and a second follower. The first follower extends from a first side of the body and a second follower extends from a second side of the body. The cam follower interfaces with the cam profile and the second cam follower interfaces with the second cam profile, with the body of the cam positioned at least partially within the longitudinal channel.

In some configurations, the cam profile includes a first slot, a second slot and a third slot, with a first ridge defined between the first slot and the second slot, and a second ridge defined between the second slot and the third slot. The width of the second slot is at least as wide as the follower, such that when the follower engages the second slot, further rotation slidably moves the blocker.

In some configurations, the latching assembly further comprises the latch is movable between a locked position and an unlocked position. In the locked position, the actuatable lock assembly is maintained in the closed orientation. In the unlocked position, the actuatable lock assembly is positionable into an open orientation. The latch has a cam profile. The first follower of the cam is configured to intermittently coact with the cam profile of the latch, to, upon rotation by the motor, move the latch between the locked position and the unlocked position.

In some configurations, the actuatable lock assembly further includes a knob positioned on a top surface opposite the bottom surface of the body of the housing assembly.

In some configurations, the actuatable lock assembly further includes a notch positioned therealong. The latch includes a portion selectively insertable into the notch when the latch is positioned in the locked position, thereby precluding movement of the actuatable lock assembly into the unlocked position.

In some configurations, the latch is one of slidably and rotatable movable relative to the housing between a locked and unlocked position.

In some configurations, the latch is slidably movable relative to the housing along an axis that is perpendicular to an axis of rotation of the cam.

In some configurations, the latch further includes a second cam profile disposed thereon. The cam further includes a second follower configured to engage the second cam profile.

In some configurations, the cam profile and the second cam profile are each substantially parallel to each other so as to define a longitudinal channel therebetween. The cam further includes a body having a first side and a second side. The first follower extends from the first side of the body, and the second follower extends from the second side of the body. The first follower interfaces with the cam profile, and the second follower interfaces with the second cam profile, with the body of the cam positioned at least partially within the longitudinal channel.

In some configurations, the external surface of a volume to be protected comprises one of the group consisting of doors, drawers, cabinets, pantries, desks, credenzas, cabinets and wardrobes.

In some configurations, the bottom surface of the housing body is mounted to an external surface of the volume to be protected. A portion of the actuatable lock assembly extends from the bottom surface of the body of the housing and toward the volume to be protected.

In another aspect of the disclosure, the disclosure is directed to a lock having a housing assembly, an actuatable lock assembly and a latch assembly. The housing assembly defines a cavity. The housing includes a body having a bottom surface mounted to an external surface of a volume to be protected. The actuatable lock assembly is associated with the housing. The actuatable lock assembly is positionable in at least a closed orientation and an open orientation. A portion of the actuatable lock assembly extends from the bottom surface of the body of the housing and toward the volume to be protected. The latch assembly further comprises a latch, a cam and a motor. The latch is movable relative to the housing and has a proximal and a distal end. The distal end is configured to interface with the actuatable lock assembly to selectively one of allow or preclude movement of the actuatable lock assembly between the closed orientation and the open orientation. The cam is rotatably mounted within the cavity of the housing. The cam is configured to interact with the latch. The motor is coupled to the cam. Actuation of the motor causes rotation of the cam, to, in turn, affect movement of the latch, to allow movement of the actuatable lock assembly out of the closed orientation or to preclude movement of the actuatable lock assembly out of the closed orientation.

In some configurations, the follower of the first cam is configured to intermittently coact with a cam profile associated with the latch.

In another aspect of the disclosure, the disclosure is directed to a lock. The lock comprises a housing, an actuatable lock assembly and a latch. The housing assembly defines a cavity. The housing includes a body having a bottom surface mounted to an external surface of a volume to be protected. The actuatable lock assembly is associated with the housing. The actuatable lock assembly is positionable in at least a closed orientation and an open orientation. A portion of the actuatable lock assembly extends from the bottom surface of the body of the housing and toward the volume to be protected, and is configured to engage with a bushing positioned within an opening that extends into a volume to be protected and to resist axial movement from within the bushing. The latch assembly further comprises a latch, a cam and a motor. The latch is movable relative to the housing, and has a proximal and a distal end. The distal end is configured to block movement of the actuatable lock assembly when in the closed orientation. The cam is rotatably mounted within the cavity of the housing and associated with the latch. The cam is configured to translate a rotational force to a translational movement of the latch. The motor is coupled to the cam. Actuation of the motor causes rotation of the cam, to, in turn, affect movement of the latch, to allow movement of the actuatable lock assembly out of the closed orientation or to preclude movement of the actuatable lock assembly out of the closed orientation.

In some configurations, a follower of the cam is configured to intermittently coact with a cam profile associated with the latch.

In some configurations, a blocker is configured to interface with the proximal end of the latch, the cam being coupled to the blocker. The blocker structurally configured to preclude movement of the latch in the locked position. The cam is configured to slidably move the blocker between a locked and an unlocked position.

BRIEF DESCRIPTION OF THE DRAWINGS

The disclosure will now be described with reference to the drawings wherein.

DETAILED DESCRIPTION OF THE DISCLOSURE

Figure 1A:
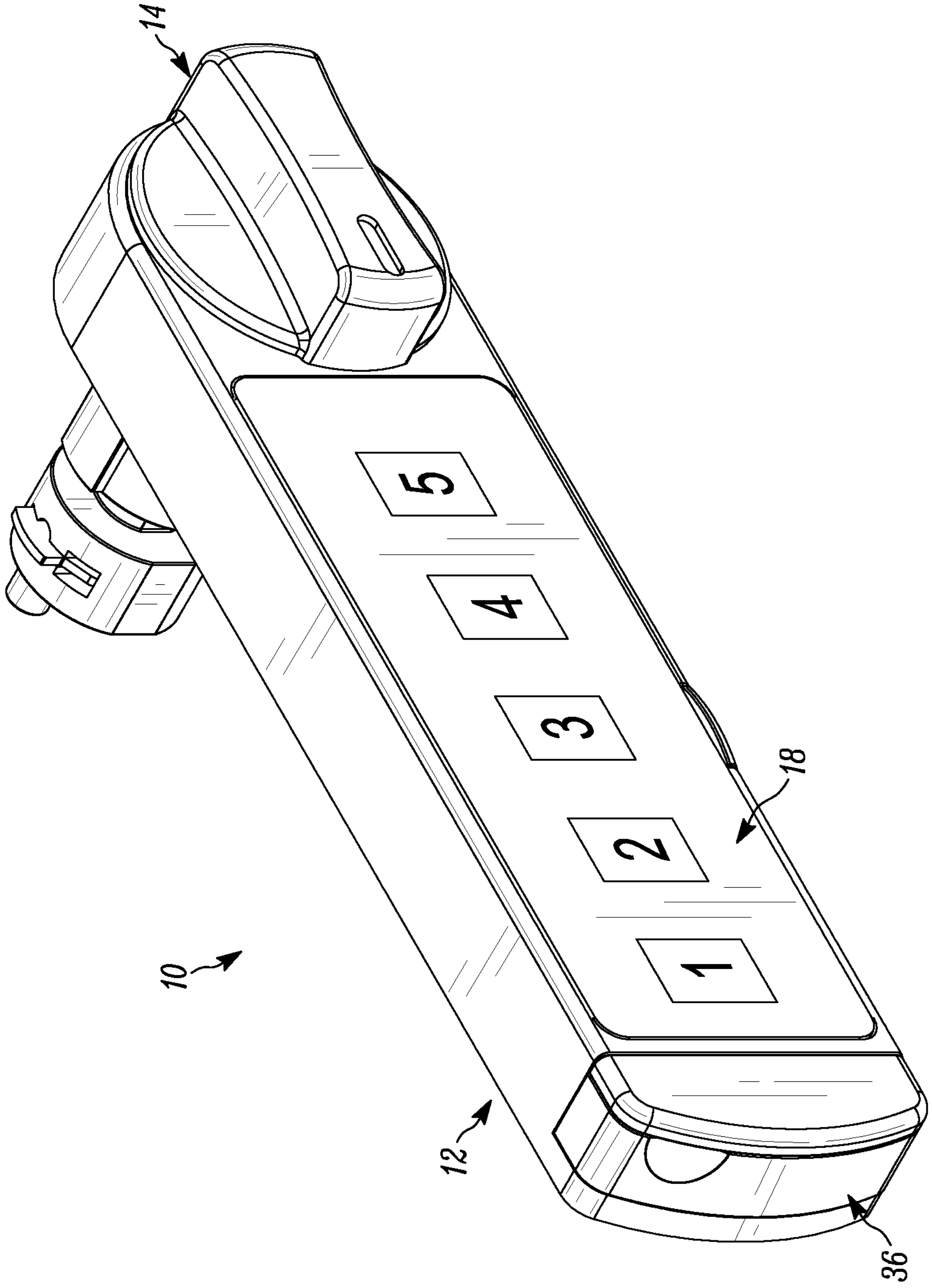
FIG. 1A of the drawings is a front perspective view of the lock of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1B:
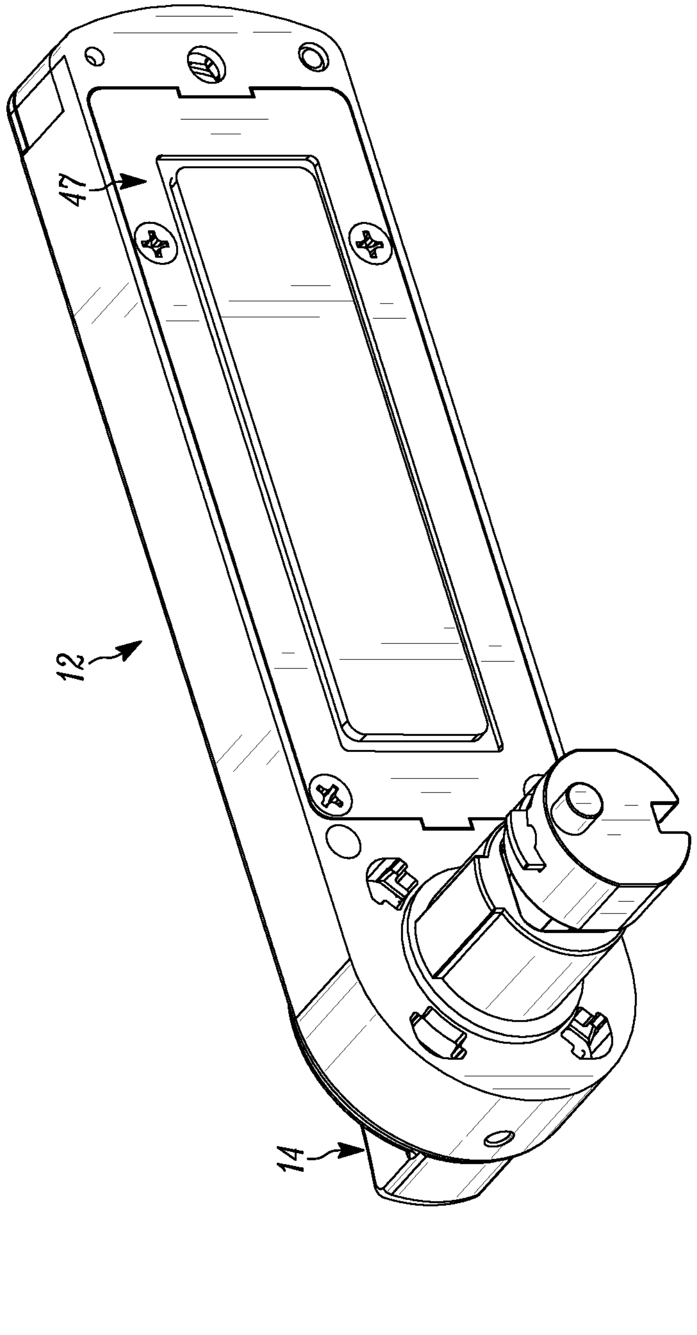
FIG. 1B of the drawings is a back perspective view of the lock of the present disclosure.

Referring now to the drawings and in particular to FIGS. 1 and 1A, the lock of the present invention is shown generally at 10. The lock 10 may be utilized in a number of different environments and in association with a number of different installations, including but not limited to, doors, drawers, cabinets, pantries, desks, etc. One particular use of the lock is in the office furniture application (i.e., desks, credenzas, cabinets, wardrobes, etc), wherein it is contemplated that the lock can be a drop in replacement for the commonly installed office furniture locks. Of course, the disclosure is not limited to use in association with such applications.

Figure 2:
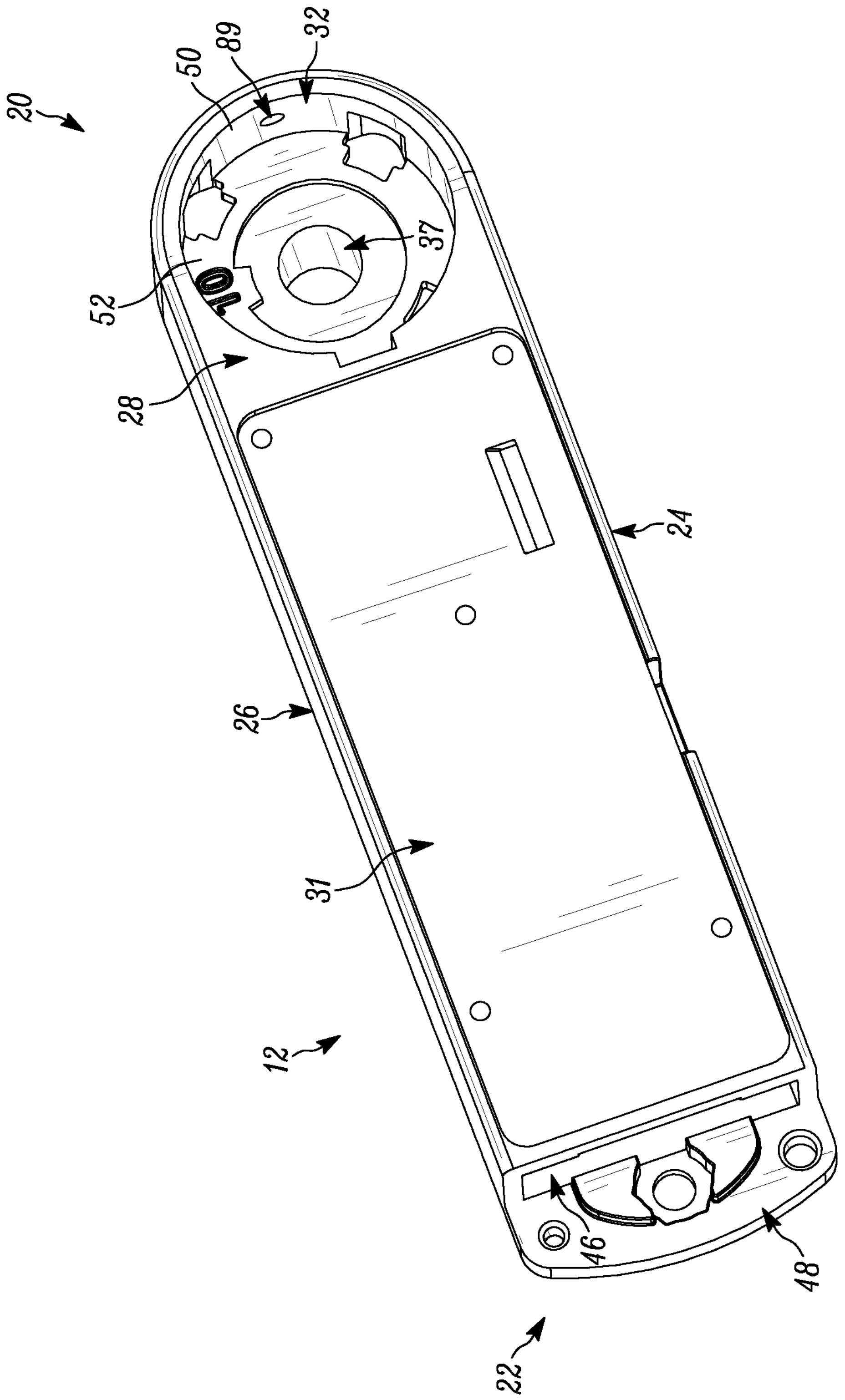
FIG. 2 of the drawings is a front perspective view of components of the housing assembly of the present disclosure.
Figure 3:
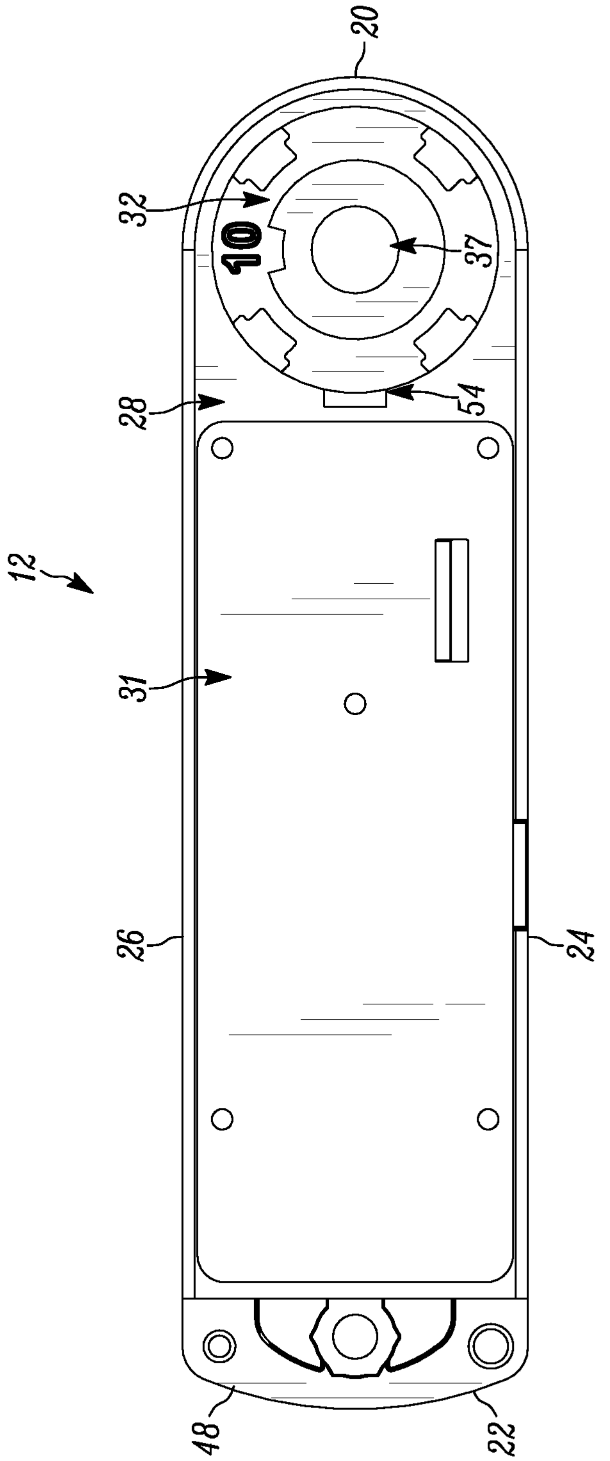
FIG. 3 of the drawings is a top plan view of components of the housing assembly of the present disclosure.
Figure 4:
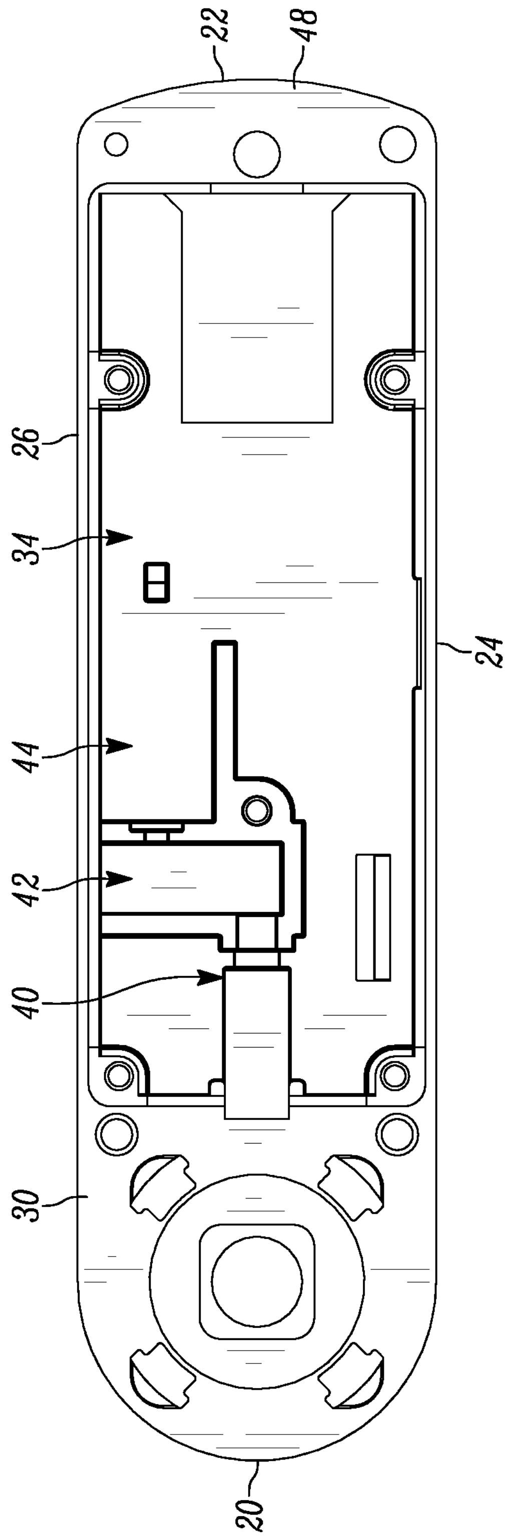
FIG. 4 of the drawings is a bottom plan view of components of the housing assembly of the present disclosure.

Referring again to FIGS. 1A and 1B, the lock 10 is shown as including housing assembly 12, actuatable lock assembly 14, latching assembly 16 (FIG. 12A) and electronic control assembly 18. With reference to FIGS. 2, 3 and 4, the housing assembly 12 comprises a body with first end 20, second end 22, first side 24 and second side 26, top 28 and bottom 30. The housing assembly is shown as comprising a single cast member, although other configurations are contemplated. The single cast member may comprise a metal or alloy thereof, or may comprise a composite or polymer material.

As set forth above, it is contemplated that the lock of the present embodiment be suitable for use in association with furniture. Traditionally, the portion of the furniture that includes a lock has generally a dimension (either a length or a width, typically) that is only slightly larger than the lock body and necessary opening therefore. Generally, such a dimension is on the order of one inch or the like. Thus, it is preferred that the lock have a housing assembly that is one inch or less in width (or length when mounted in another direction) so as to be mountable on such a surface without a portion thereof overhanging the surface. As such, the lock of the present disclosure is sized so as to fit into most of the cabinets and furniture presently manufactured, without requiring any changes or redesign of the cabinet or furniture. Additionally, such a design allows for the retrofitting of existing cabinets and furniture. It will be understood that the lock is not limited to use in association with cabinets or furniture, and that such use is merely utilized for purposes of illustration. It is further contemplated, that to achieve the one inch dimension, the diameter of the cavity 32 is 0.93 inches, the diameter of the knob is 0.97 inches, with the thickness of the housing assembly being 0.39 inches and the thickness including the knob is 0.70 inches. Additionally, it is contemplated that the motor is 0.61 inches in length and 0.32 inches in width. Furthermore, it is contemplated that the battery have a diameter of 0.79 inches and a thickness of 0.13 inches.

The top 28 includes a recessed portion 31 which is configured to receive a keypad or other input device thereon. In one embodiment, the input device may comprise a number pad having a plurality of discrete numbers thereon. The number pad may include an outer perimeter and a thickness that is well suited for fitting into the recessed portion. In the embodiment shown, the recessed portion extends over much of the top 28 between the first side and the second side. The recessed portion may include an opening which provides for the passage of wiring or other electrical connectors that provides electrical communication between the input device and the rest of the electronic control assembly.

At or near the first end 20 of the housing assembly 12, the acutuatable lock region 32 is positioned. The actuatable lock region 32 comprises an annular cavity having a base 50 and an upstand wall 52. The base 50 includes a central opening 37 and may include other structures and openings therearound. The central opening 37 is configured for the passage of the portions of the actuatable lock assembly 14 and to link structures thereof on either side of the base 50. For example, in the embodiment shown, four generally round chamfered openings (configured to receive fasteners) are disposed about the central opening in a generally uniformly spaced apart orientation. Additionally, four slot like openings are positioned in the space therebetween.

The upstanding wall 52 is a generally annular wall having a latch opening 54 extending therein providing communication between the cavity of the actuatable lock region with the main body cavity 34. In addition, wall surface variations or indentations may be presented to match with the four slot like openings that are defined in the base. These may comprise detents that cooperate with spring loaded balls or the like incorporated into the knob 70 (FIGS. 10 and 11) to form local positions of stable equilibrium wherein the knob can rest in such a position. It is contemplated that with the four different locations between two and four positions are defined (depending on the rotation of the knob). In other embodiments, a fewer or greater number of detents may be disposed on the upstanding wall 52 to cooperate with spring loaded balls incorporated into the knob. In still other embodiments, structures other than spring loaded balls, such as biasing leaves may be utilized.

In the embodiment shown, the upstanding wall extends from the base 50 to the top 28, and is generally perpendicular to the top 28 as well as the base 50 of the actuatable lock region 32. Additionally, the second end 22 of the housing assembly 12 may have a configuration that generally matches the upstand wall 52.

Referring now to FIG. 4, extending across much of the housing assembly is the main body cavity 34 which opens toward the bottom 30. In the embodiment shown, the main body cavity is on the opposite side of the top from the recessed region 31. The main body cavity 34 includes a latch channel 40, a blocker channel 42, a motor retaining region 44 and a battery opening 46 (FIG. 2). The latch channel 40 extends away from the latch opening 54 of the upstand wall 52 and intersects with the blocker channel 42. The latch opening is generally tangent to the upstand wall 52 and extends longitudinally along the main body cavity, with the blocker channel 42 being substantially perpendicular thereto. Of course, other angular relationships are contemplated between the components and it is not necessarily that the components are tangent and perpendicular to each other, or that they align with the outer configuration of the housing assembly, including oblique relationships. The motor retaining region 44 is positioned adjacent to the blocker channel, and is configured to receive and maintain the motor in the proper orientation. A cover 47 can be provided to extend over the main body cavity 34, and may be secured thereto through a plurality of fasteners. The cover or the housing can be coupled to an outside surface through fasteners at either end thereof, and/or through an adhesive (such as double stick tape) that can be applied to the cover 47.

The battery opening 46 is positioned at the second end 22 of the housing assembly and provides ingress to the main body cavity 34. In the embodiment shown, the opening generally has a rectangular cross-sectional configuration that substantially matches the cross-sectional configuration of the main body opening. A flange may extend from the battery opening at the bottom 30 of the housing assembly. The flange includes a plurality of openings that are configured for the receipt of pins or fasteners and the like.

Figure 5:
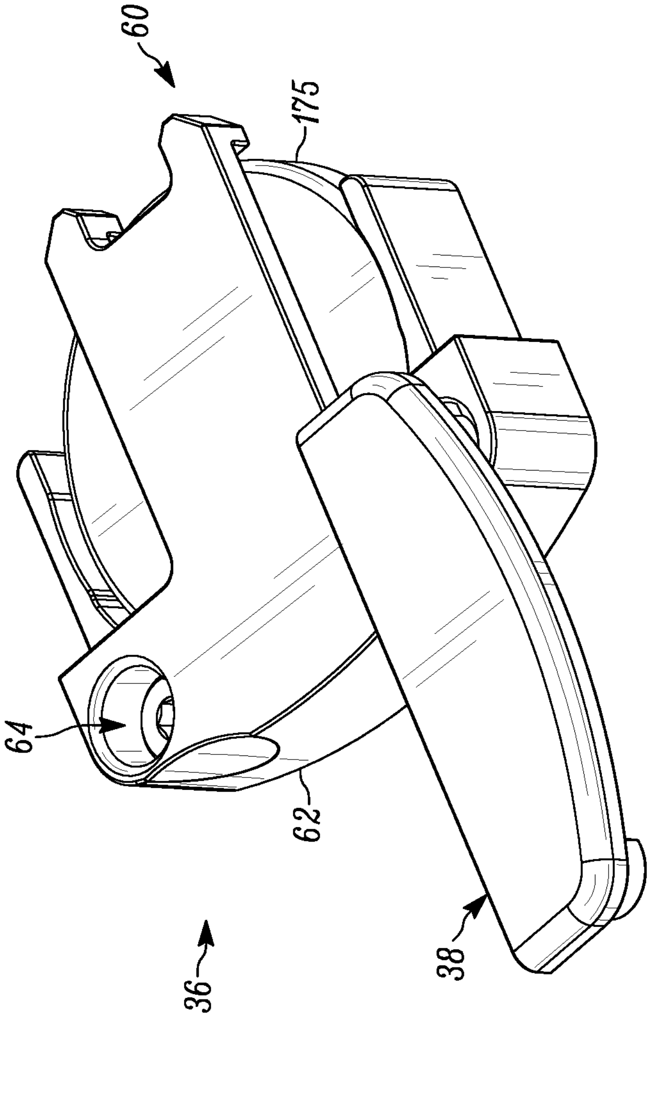
FIG. 5 of the drawings is a top perspective view of the battery housing of the housing assembly of the present disclosure, showing, in particular, the cap in an open position providing access to a fastener which secures the battery housing to the housing assembly at the flange.
Figure 6:
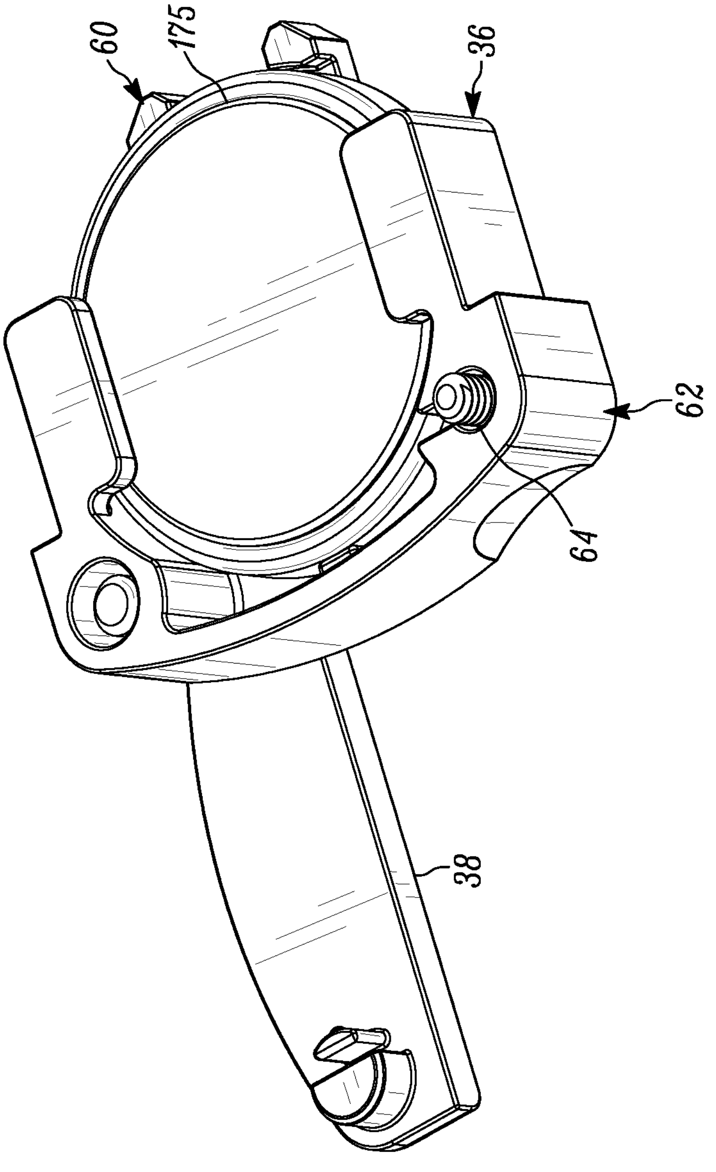
FIG. 6 of the drawings is a bottom perspective view of the battery housing of the housing assembly of the present disclosure, showing, in particular, the cap in an open position providing access to a fastener which secures the battery housing to the housing assembly at the flange.

With reference to FIGS. 5 and 6, the housing assembly 12 further includes a battery housing 36 and an outer cap 38. The battery housing 36 is configured to receive a battery (generally a 3V lithium battery, such as a CR2032 or the like) and to allow for the proper positioning thereof in operation, as well as removal from the housing assembly for purposes of battery replacement. More particularly, the battery housing includes battery cradle 60 and outer region 62. The battery cradle 60 is configured to retain the battery in a stable orientation for coupling to leads that are in electrical communication with electronic control assembly.

The outer region 62 includes a body configuration that fits over the flange and substantially matches the shape of the housing assembly 12 at the first end 20 thereof. The outer region includes an opening which corresponds to one of the openings on the flange 48 so as to allow coupling of the two components with a fastener such as a screw or nut. The removable cap 38 may be positioned over the top of the outer region so as to cover the fastener. In this manner, one must first remove the removable cap to have access to the fastener for disconnecting of the battery housing 36 and, in turn, the battery, from the housing assembly 12, toward removal thereof.

The configuration of the battery housing has a number of functions and advantages. In particular, the battery housing grips and holds the battery, aligns the battery as the battery is inserted into the lock enclosure and insures that the battery makes a proper and secure connection to the contacts of the electronic control assembly. The battery housing additionally helps secure the battery position into the enclosure as it is seated into the enclosure. The battery housing provides means for gripping and withdrawing the battery from the lock enclosure when the changing of the battery is necessary. Advantageously, with the battery housing shown, such a replacement can be achieved without the use of a tool (i.e., tweezers and the like). Furthermore, the battery housing allows for a surface for securing the battery into the lock enclosure with a fastener, and the cap provides a cover for the fastener.

Figure 7:
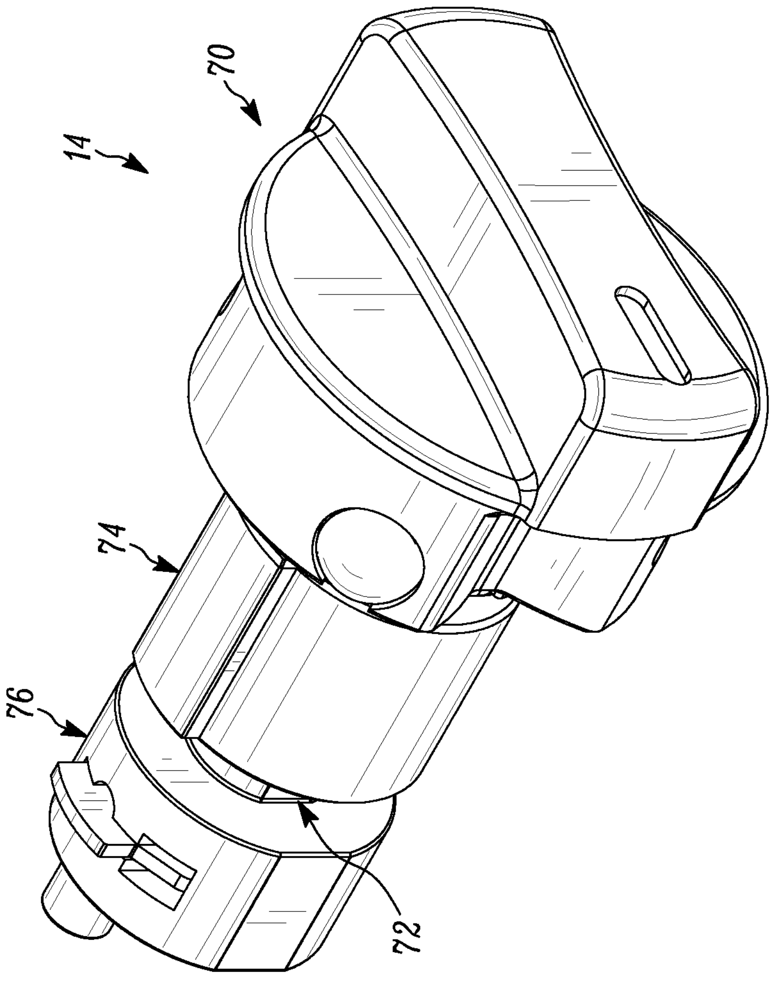
FIG. 7 of the drawings is a perspective view of the actuatable lock assembly of the present disclosure.
Figure 8:
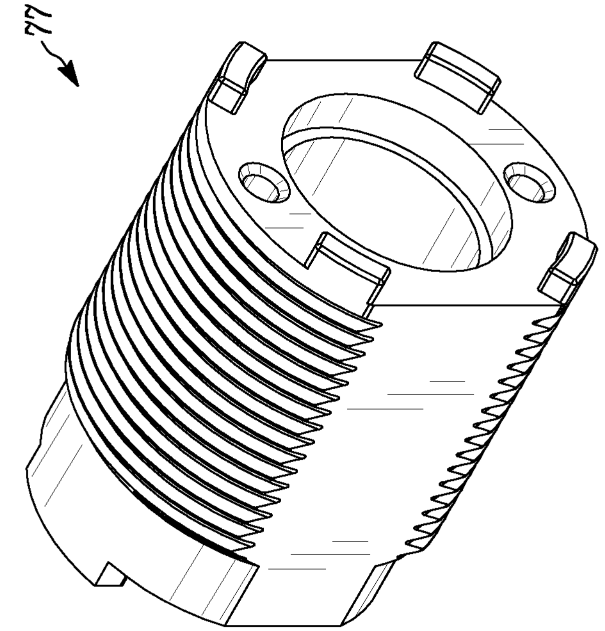
FIG. 8 of the drawings is a perspective view of an existing furniture lock bushing that may be installed on furniture, or other structures which incorporate a lock.

Referring now to FIG. 7 and FIG. 8, the actuatable lock assembly includes knob 70, lock driver 72 and lock spacer 74. These components are coupled to furniture bushing 77. It will be understood that furniture bushing 77 may comprise existing components of an existing furniture lock that has been mounted to the furniture. Advantageously, the present disclosure is directed to an actuatable lock assembly that is configured to fit within the existing furniture bushing 77. Of course, in other embodiments, lock flange and furniture bushing 77 may be provided with the lock. In addition, other configurations that do not utilize the bushing are contemplated.

Figure 9:
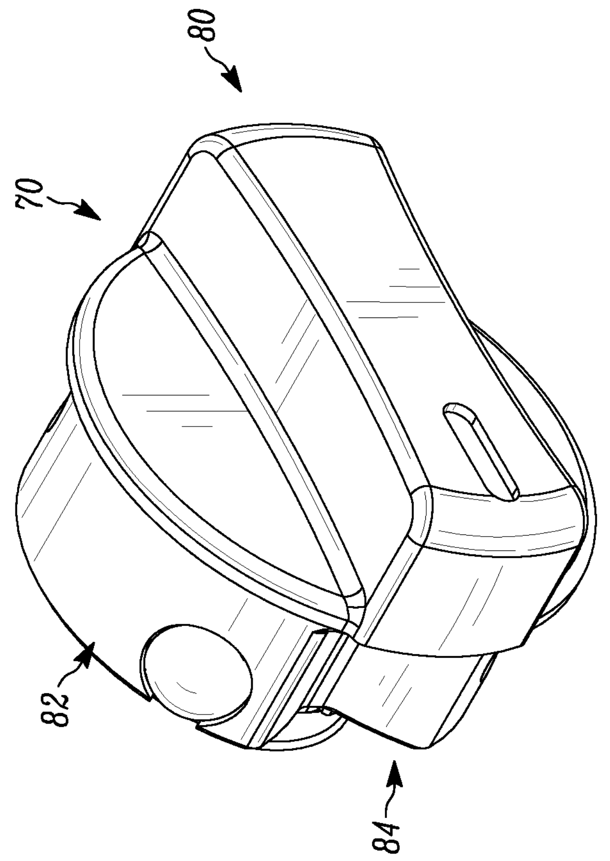
FIG. 9 of the drawings is a front perspective view of the knob of the actuatable lock assembly of the present disclosure.
Figure 10:
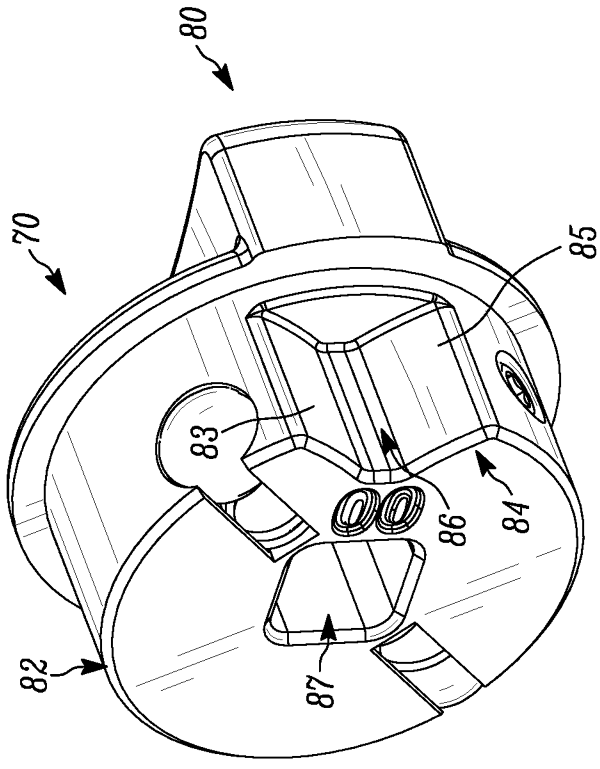
FIG. 10 of the drawings is a back perspective view of the knob of the actuatable lock assembly of the present disclosure.
Figure 11:
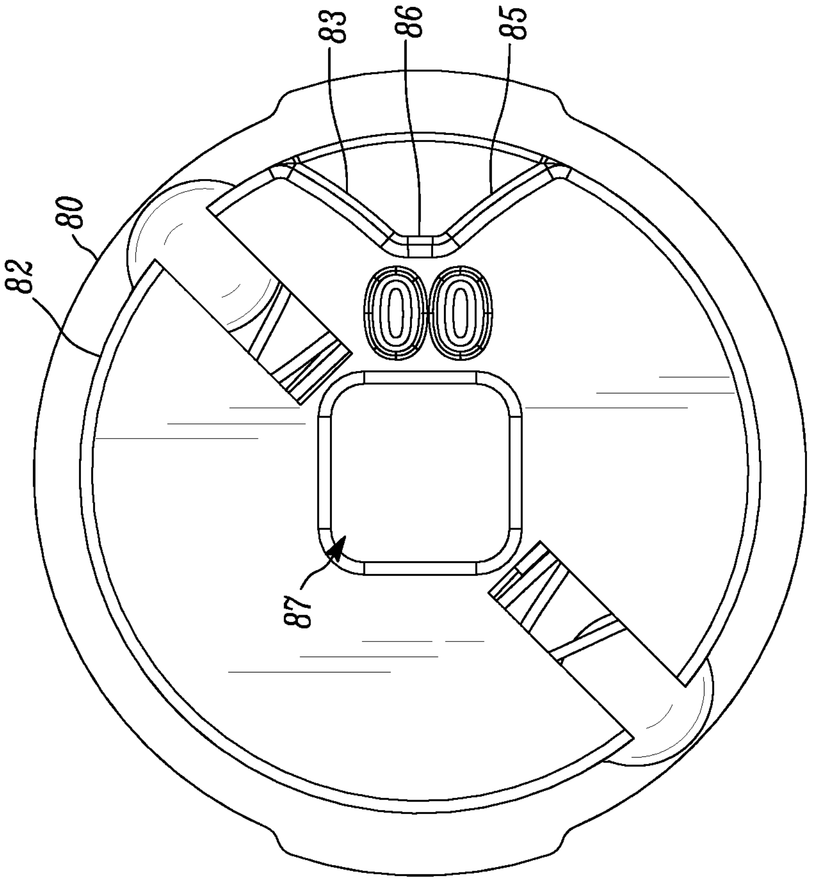
FIG. 11 of the drawings is a bottom plan view of the knob of the actuatable lock assembly of the present disclosure.

Referring now to FIG. 9 through 11, the knob 70 comprises a substantially cylindrical element having an outside surface 80 and dependent skirt 82. As will be explained below the knob 70 is positioned within the cavity defined by the actuatable lock region 32 of the housing assembly 12. The outside surface 80 is configured to facilitate the grasping and rotating thereof by a user, while the knob is in the cavity of the actuatable lock region. In the embodiment shown, the outside surface includes thumb turn regions which are configured to be grasped by the fingers of a user. Of course, a number of different surface configurations are contemplated to accommodate a particular design or a particular application. In another embodiment, in place of a knob, a detachable and reattachable tool can be utilized that plugs into the lock driver when needed. In other embodiments, in place of rotating, the knob can translate in an up and down or right and left configuration. In still other embodiments, the knob may comprise a movement inward and outward (wherein the knob may be biased into an outward position). In each of these embodiments, the movement of the knob (i.e., rotating, translating, moving inward and outward) can be selectively permitted by the positioning of the blocker into the unlocked position.

The dependent skirt 82 extends annularly around the knob 70 below the outside surface 80. The dependent skirt 82 includes axial notch 84 which extends radially inward from the surface of the dependent skirt. The axial notch, as will be explained, is sized so as to receive the distal end of the latch of the latching assembly. The axial notch 84 is defined by two inwardly sloped surfaces, namely, first surface 83 and second surface 85, which meet at vertex 86. In the embodiment shown, the two sloped surfaces are angled relative to each other, defining an angle therebetween. While a number of variations are contemplated, at the dependent skirt, the axial notch defines an approximately 48° arc along the dependent skirt. The vertex 86, in the embodiment shown, comprises a line that is parallel to the axis of rotation of the knob 70 within the cavity of the housing assembly. The surfaces 83, 85 are generally convex surfaces that are configured to shape matingly engage with the distal end of the latch, so that when the knob is turned, the surfaces 83 and/or 85 urge the latch out of the axial notch.

Figure 10B:
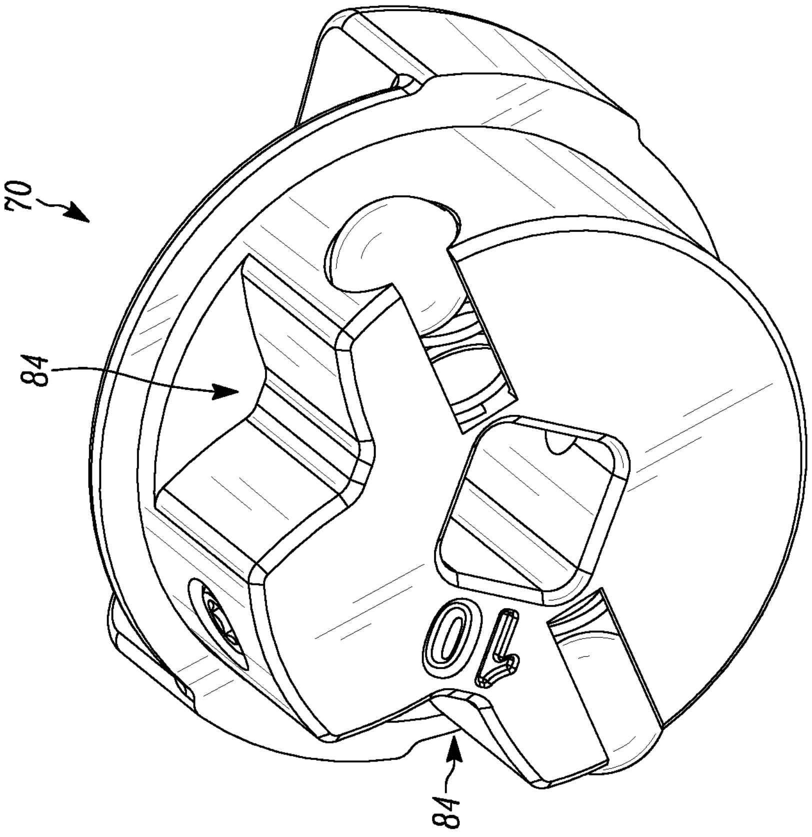
FIG. 10B of the drawings is a back perspective view of an alternate configuration of the knob of the actuatable lock assembly of the present disclosure, showing, in particular, a plurality of axial notches that are spaced apart from each other.

Of course, other configurations are contemplated for the axial notch, which may be paired with a latch having a particular configuration for the distal end thereof. Additionally, it will be understood that even with a configuration like that which is shown in the preferred embodiment, the angle and the length of the axial notch can be varied to achieve a different imparting of force against the distal end of the latch. It will be understood that the knob can be, depending on the embodiment, rotated clockwise or counterclockwise differing degrees of rotation to complete the operation. For example, it may be desirable to have the knob turn 90° or 180° in either the clockwise or counterclockwise direction to achieve the desired operation, however other degrees of rotation are likewise contemplated. Additionally, it is contemplated that the knob includes a plurality of axial notches, such as, for example, two axial notches that are spaced apart (i.e., 90° from each other). In such an embodiment, the blocker can operate in either position of the knob. In one example, such as for a locker application, when the door is unlocked and the knob is moved to the open position, the latch can enter the second axial notch and then the blocker can be moved to a locked configuration. As such, the lock is essentially locked in the unlocked configuration. This provides locking ability in more than one configuration of the knob (and, the associated actuatable lock assembly). One example of such a knob 70 is shown in FIG. 10B, with the axial notch 84 and the second axial notch 84' being shown on the knob 70. Of course, a greater number of axial notches, including, but not limited to three and four axial notches, is likewise contemplated.

The knob 70 may be coupled to the lock driver 72 (FIG. 7) through an interference fit, coupled with a set screw. In particular, the knob 70 includes an axially centered cavity 87 which is configured to engagingly receive the first end of the lock driver. In the embodiment shown, the cavity has a square cross-sectional configuration, such that when the correspondingly shaped first end of the lock driver is inserted, the two structures rotate together. A set screw, or pair of set screws can be extended through the dependent skirt 82 and into the cavity to engage the lock driver and to lock the lock driver in the installed position. Advantageously, access to the set screw is provided by way of a corresponding opening 89 (FIG. 2) on the second end of the housing assembly. It will be understood that the opening of the housing assembly lines up with each one of the set screws on the dependent skirt 82 of the knob 70 when the knob is in a position other than the locked position (that is, the opening can be moved along the second end as long as when locked, the set screw does not match up with the opening). When in the locked position, each of the set screw is offset relative to the opening such that the set screw remains inaccessible. It will further be understood that the set screws provide a means by which to change the effective length of the lock driver. That is, the opening in the knob for receiving the lock driver allows for the lock driver to be inserted and retained by the set screws, at different depths within the opening. As a result, the single structure can accommodate variations in the overall lock depth caused by the application or design.

Figure 7A:
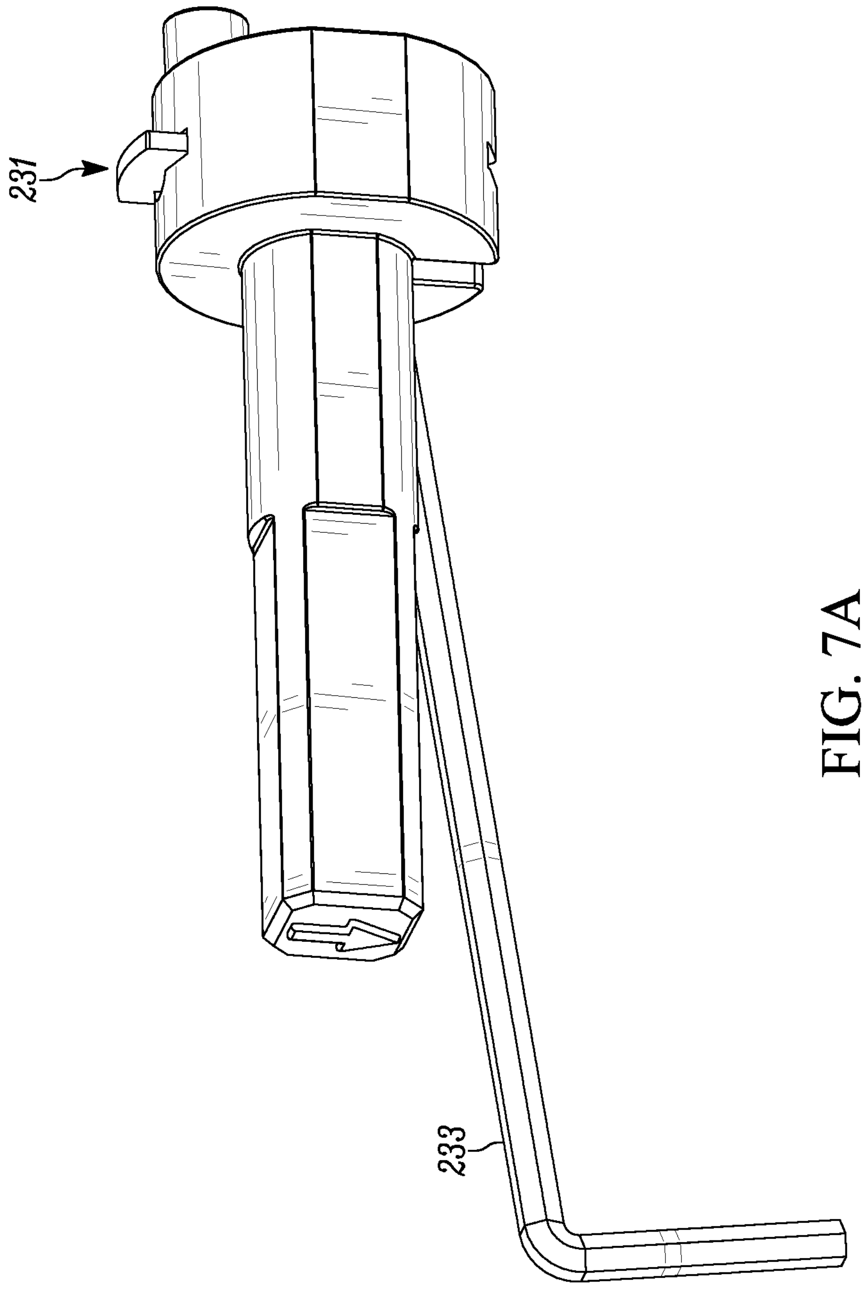
FIG. 7A of the drawings is a perspective view of the lock driver, showing, in particular, the insertion of the attachment tool which can be used to move the master tumbler to allow for insertion into the bushing.
Figure 7B:
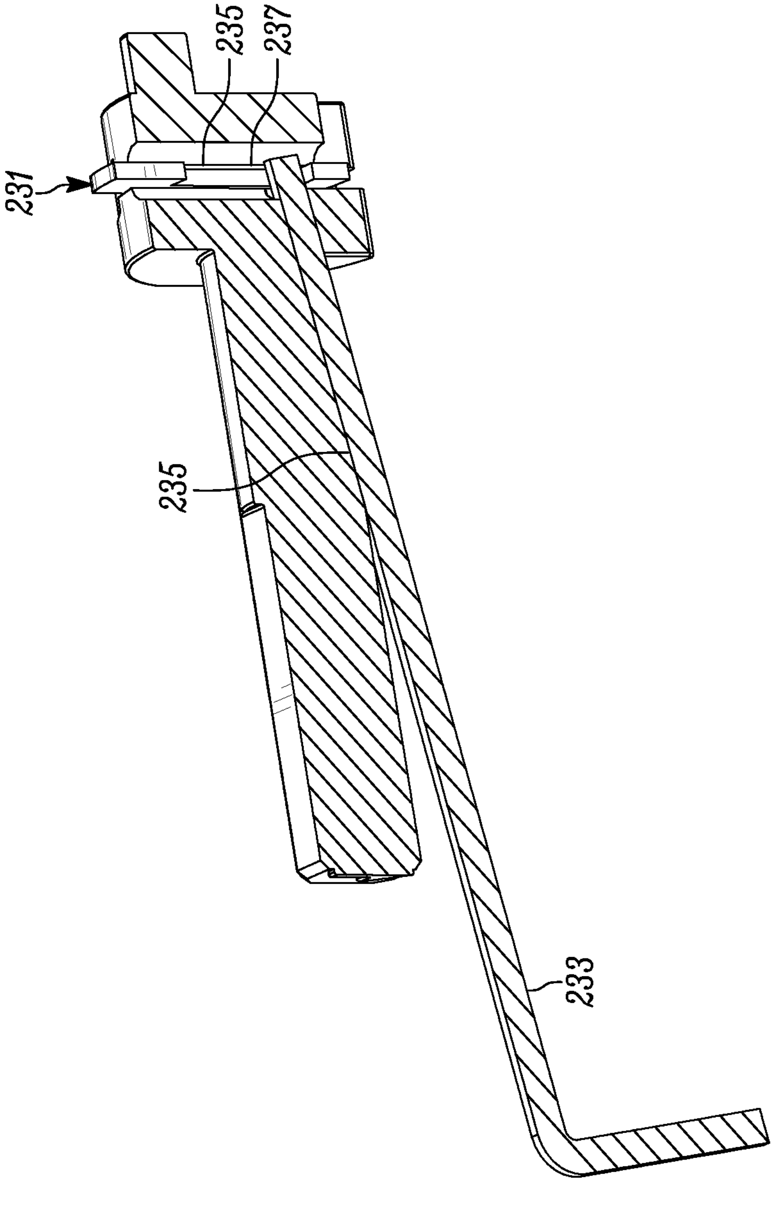
FIG. 7B of the drawings is a cross-sectional view of the lock driver, showing, in particular, the insertion of the attachment tool which can be used to move the master tumbler to allow for insertion into the bushing.

The lock driver 72 is shown in greater detail in FIGS. 7A and 7B as comprising master tumbler 231 which is slidably mounted in a channel that extends perpendicular to the axis of rotation of the lock driver in operation. A tool 233 is configured to be directable through a slot 235 in the lock driver so as to extend through opening 237 in the master tumbler 231. The master tumbler 231 is biased by a spring (or other biasing member) so as to have an end stick out beyond the lock driver 72. As such, when the lock driver 72 is inserted into the bushing, the tool can be utilized to overcome the biasing member and to pull the master tumbler into the lock driver 72. Once in the driver, the lock driver can be inserted into the bushing. Once inserted, the tool 233 can be removed, and the spring will return the master tumbler to an orientation that extends out of the lock driver and interfaces with an axial channel in the bushing, which maintains the lock driver in engagement with the bushing so that it can rotate about its axis without being able to move axially. The tool can be reinserted to move the master tumbler so as to have the end thereof exit the axial channel of the bushing, so as to remove the lock driver from the bushing. In other embodiments, the lock driver 72 can be manipulated or tilted for installation purposes.

The lock spacer 74 is positionable along the lock driver and couples to the furniture bushing 77 while allowing adjustment to compensate for slight variations in the depth of the furniture bushing. The lock spacer includes a tumbler flange which is configured to engage the furniture bushing to allow relative rotative movement while precluding axial movement of the lock relative to the furniture bushing. More particularly, the spacer flange serves to fit into the grooves in the bushing that will interlock into the flange and into the grooves in the housing. With such a configuration, in the event that someone applies a force to the external housing, the force will be transferred from the housing to the spacer and to the furniture bushing, but not to the lock driver, therefore maintaining the security of the lock. This is due to the free rotation of the spacer around the driver. Additionally, the spacer precludes radial movement.

Figure 12A:
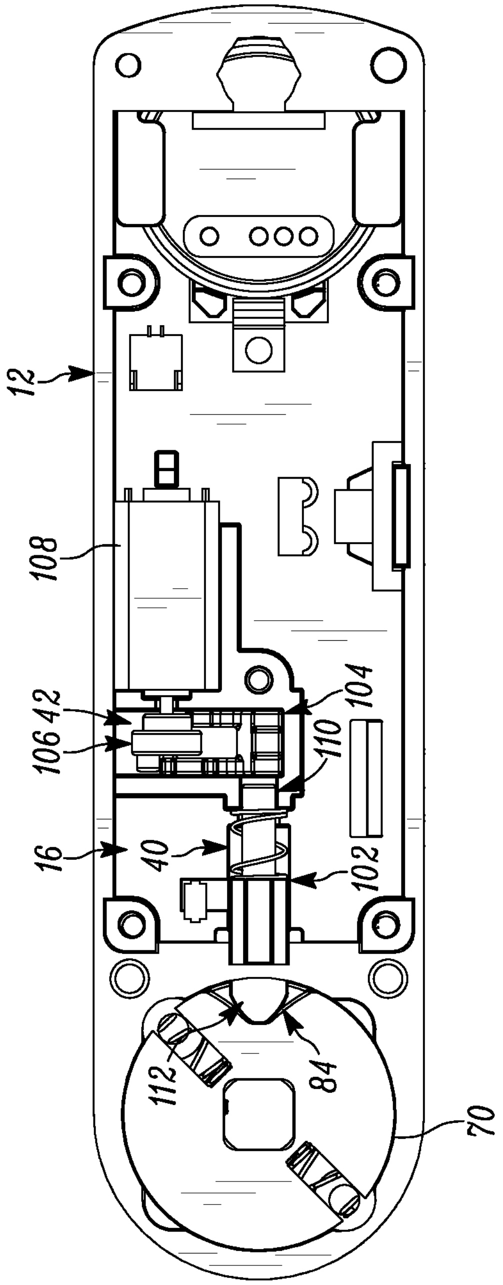
FIG. 12A of the drawings is cross-sectional view of the lock showing, in particular, the latching assembly as mounted within the housing assembly and interfacing with the knob of the actuatable lock assembly of the present disclosure, showing the lock in a locked position.
Figure 12B:
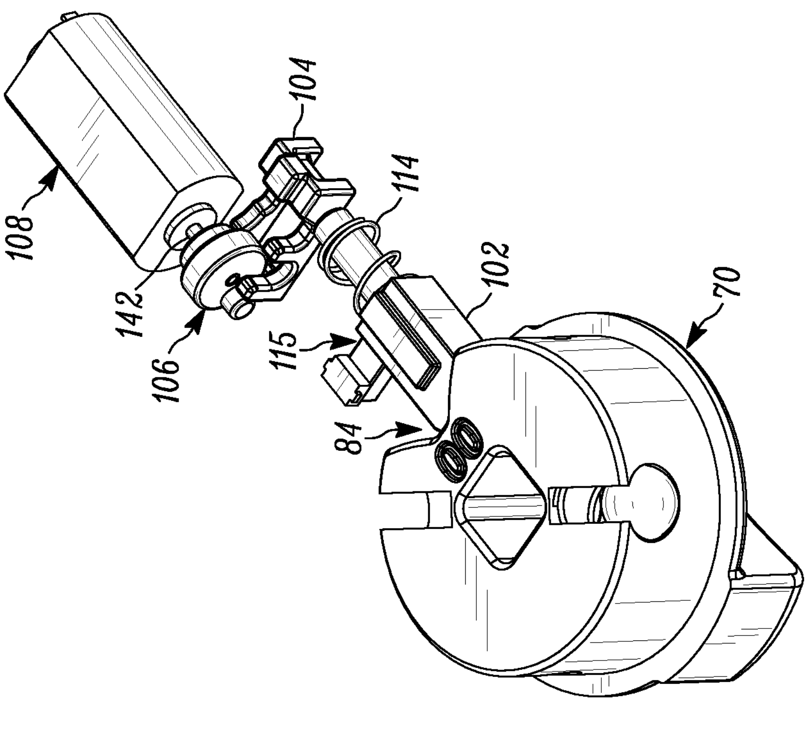
FIG. 12B of the drawings is a perspective view of components of the latching assembly and the knob of the actuatable lock assembly in the locked position.
Figure 13A:
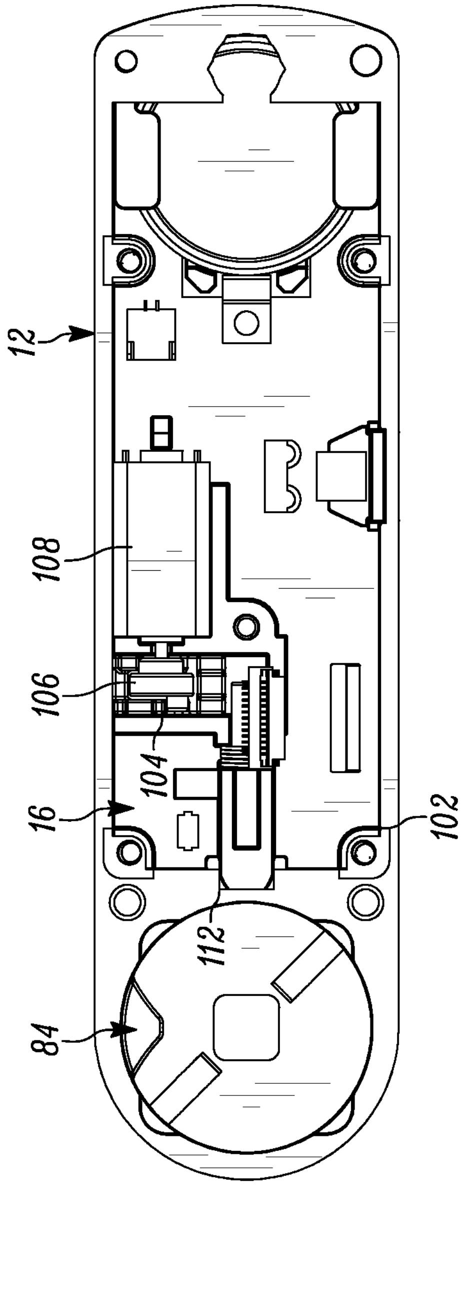
FIG. 13A of the drawings is a cross-sectional view of the lock showing, in particular, the latching assembly as mounted within the housing assembly and interfacing with the knob of the actuatable lock assembly of the present disclosure, showing the lock in an unlocked position.
Figure 13B:
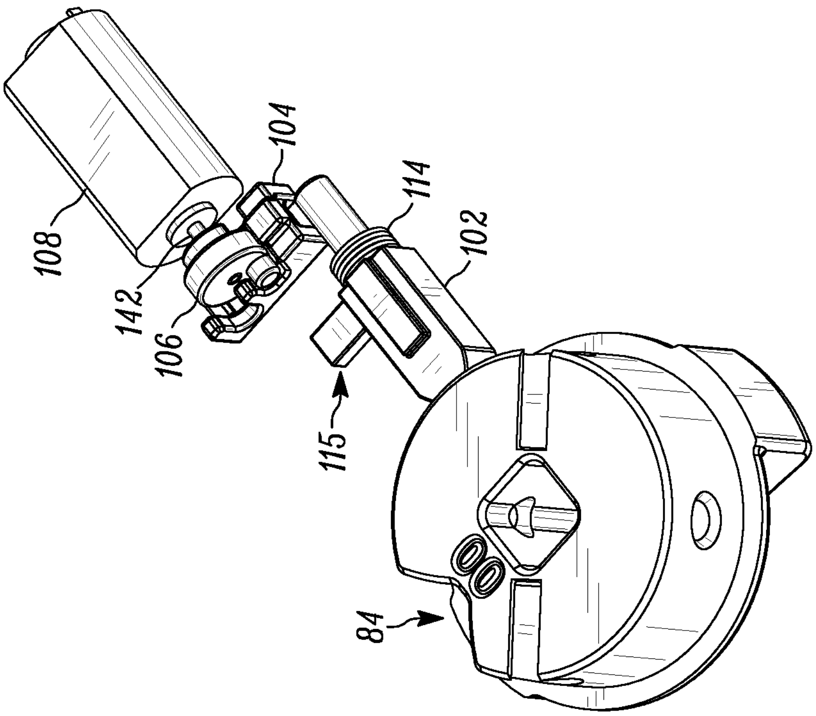
FIG. 13B of the drawings is a perspective view of components of the latching assembly and the knob of the actuatable lock assembly in the unlocked position.
Figure 14:
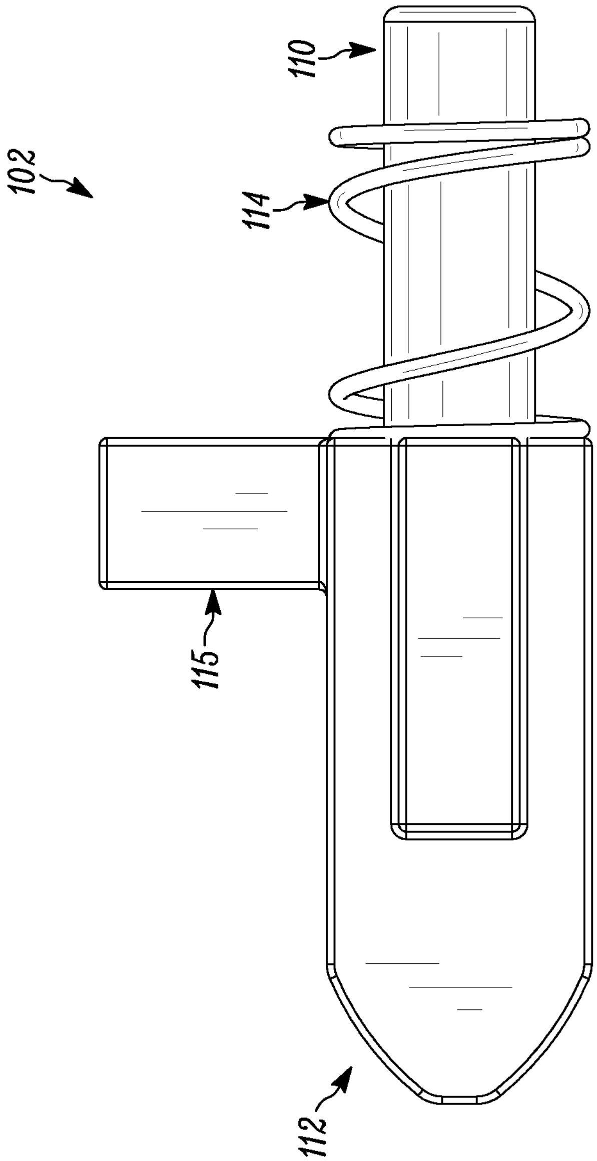
FIG. 14 of the drawings is a side elevational view of the latch of the present disclosure, shown with the biasing member extending around a portion thereof.

Referring now to FIGS. 12A, 12B, 13A and 13B, the latching assembly 16 is shown as comprising latch 102, blocker 104, cam 106 and motor 108. It will be understood that FIGS. 12A and 12B show the blocker in the locked position, and, the FIGS. 13A and 13B show the blocker in the unlocked position. The latch 102 includes proximal end 110 and distal end 112. The latch 102 is positioned within the latch channel 40 and is slidably movable therewithin. In the locked position, which is shown in FIGS. 12A and 12B, and as will be explained, the distal end 112 of the latch 102 extends into the axial notch 84 of the knob 70. The proximal end 110 is configured to interface with the blocker 104. With further reference to FIG. 14 a biasing member, in the form of a compression spring 114 extends between the latch and the housing assembly so as to bias the distal end of the latch toward and into the knob 70. Additionally, a flag or flange 115 extends transversely from the latch. As will be explained, the flag 115 interfaces with a position sensor and provides to the position sensor the orientation and position of the latch. In other embodiments, other mechanism may be utilized for monitoring the position of the latch and/or knob, such as, for example, detecting directly the position of the knob.

Figure 15:
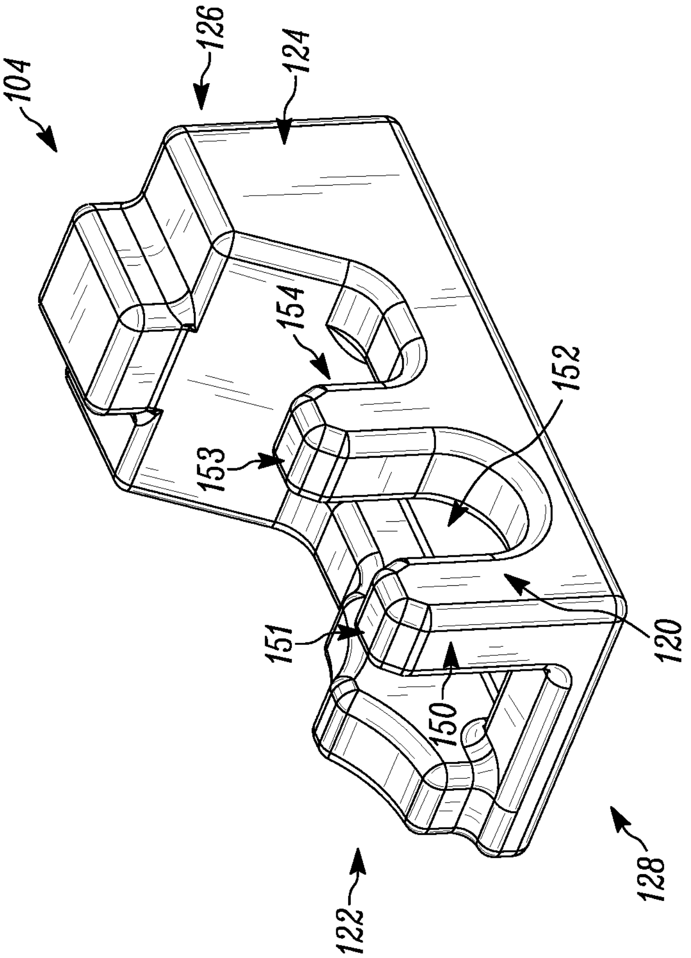
FIG. 15 of the drawings comprises a front perspective view of the blocker of the present disclosure.
Figure 16:
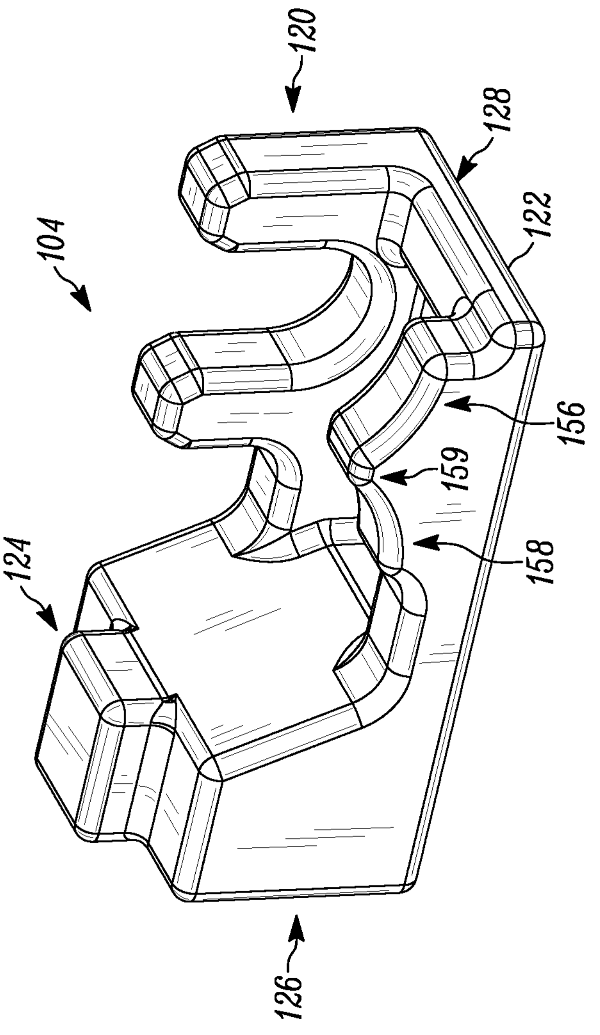
FIG. 16 of the drawings comprises a back perspective view of the blocker of the present disclosure.

With reference to FIGS. 15 and 16, the blocker 104 is shown as comprising first cam profile 120, second cam profile 122, latch engagement body 124. The latch engagement body 124 is positioned at a second end 128 of the blocker 104. The first cam profile 120 extends between the first end 126 and the latch engagement body 124. Similarly the second cam profile 122 extends between the first end 126 and the latch engagement body 124 in a generally parallel and spaced apart orientation from the first cam profile. The spaced apart orientation of the two cam profiles defines a longitudinal channel therebetween. It will be understood that the cam body rotatably extends through the longitudinal channel as the followers thereof interact with the first and second cam profiles.

The first cam profile 120 includes first slot 150, second slot 152, and third slot 154. A first ridge 151 is defined between the first slot 150 and the second slot 152. A second ridge 153 is defined between the second slot 152 and the third slot 154. In the embodiment shown, the first slot 150 is formed on the outside of the first ridge 151, however, provides a single sided slot function. The second cam profile 122 includes first ramp 156, second ramp 158 and peak 159 positioned therebetween.

In the embodiment shown, the blocker comprises a metal member, such as zinc or the like. Of course, other materials are contemplated. It will be understood that the blocker is the component that precludes latch movement in the event that the knob is attempted to be rotated in the locked position so as to defeat the lock. As such, the latch engagement body 124 may comprise a solid member that provides the necessary strength to overcome the forces that may be exerted against the knob and, in turn, the latch.

Figure 17:
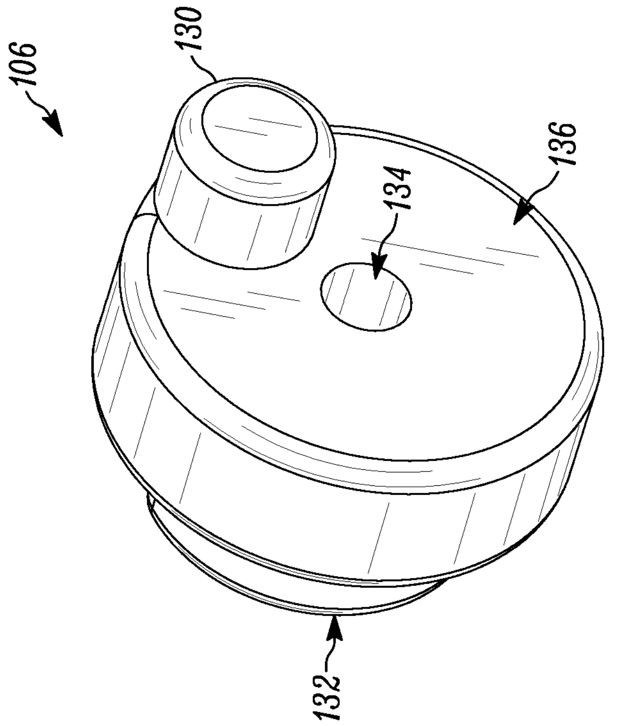
FIG. 17 of the drawings comprises a front perspective view of the cam of the present disclosure.
Figure 18:
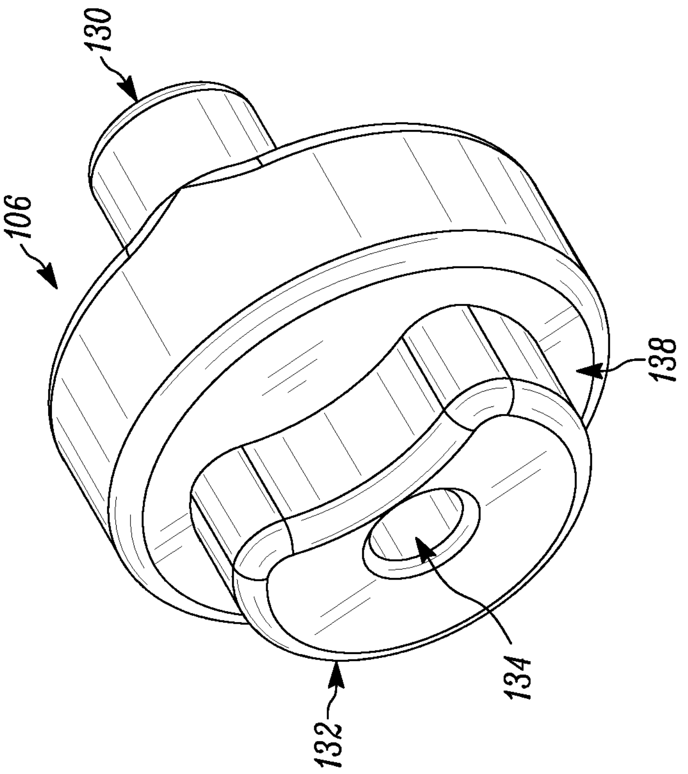
FIG. 18 of the drawings comprises a back perspective view of the cam of the present disclosure.

With reference to FIGS. 17 and 18, the cam 106 includes a body having a first side 136 and a second side 138, and, an axis of rotation 134. The first side includes first follower 130 and the second side includes second follower 132. With reference to FIGS. 12B and 13B, the cam is rotatably coupled to the motor 108 about axle 142. It will be understood that the motor is positioned within the motor retaining region with the axle extending into the blocker channel. With continued reference to FIGS. 12A, 12B, 13A and 13B, the cam 106 is positioned so that the body is within the longitudinal channel between the first and second cam profiles, the first follower 130 is configured to interface with the first cam profile 120 and the second follower 132 is configured to interface with the second cam profile 122. As can be seen in FIGS. 19A through 19E, sequentially, and as will be explained below in greater detail, as the motor rotates the cam 106, the cam 106 intermittently connects the first follower with the first cam profile, to, in turn, translate the blocker within the blocker channel.

It is contemplated that other cam profiles and other cam follower configurations may be utilized to achieve the intermittent interaction therebetween, to, translate the blocker along the blocker channel between a blocking position and a released position. It is further contemplated that the position of the two cam profiles can be swapped. Additionally, the blocker may have a alternate configurations for the first cam profile or the second cam profile. For example, additional slots may be presented, and corresponding ridges to increase the stroke of the blocker movement through additional rotation and interaction with the cam, if necessary.

Figure 20:
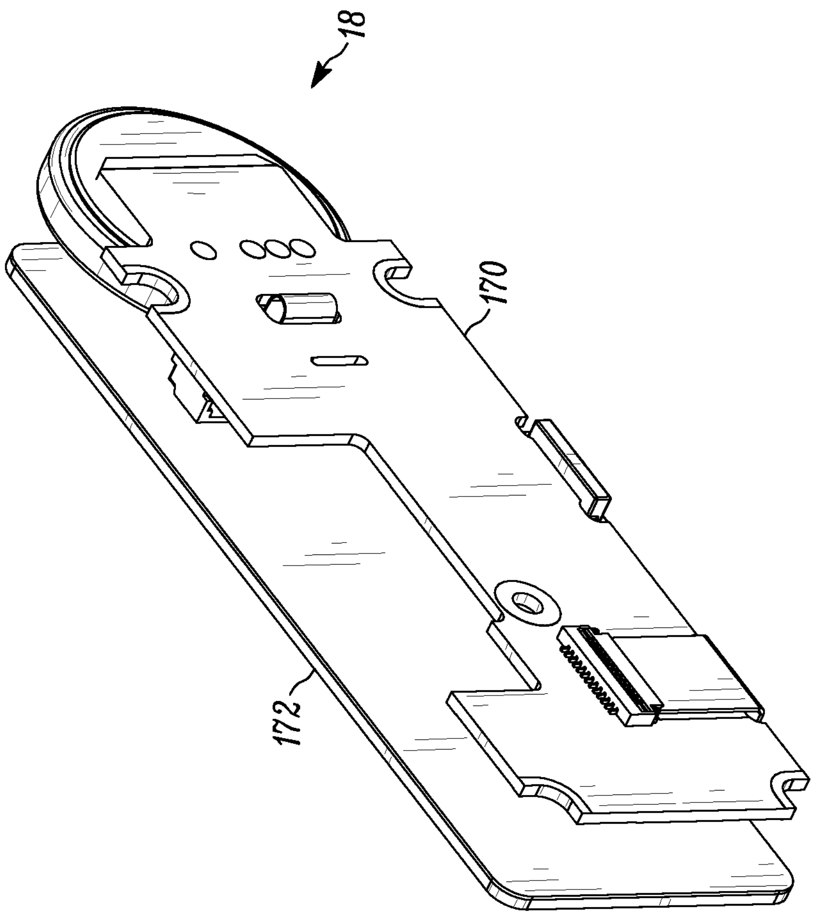
FIG. 20 of the drawings comprises a front perspective view of the electronic control assembly of the present disclosure.
Figure 21:
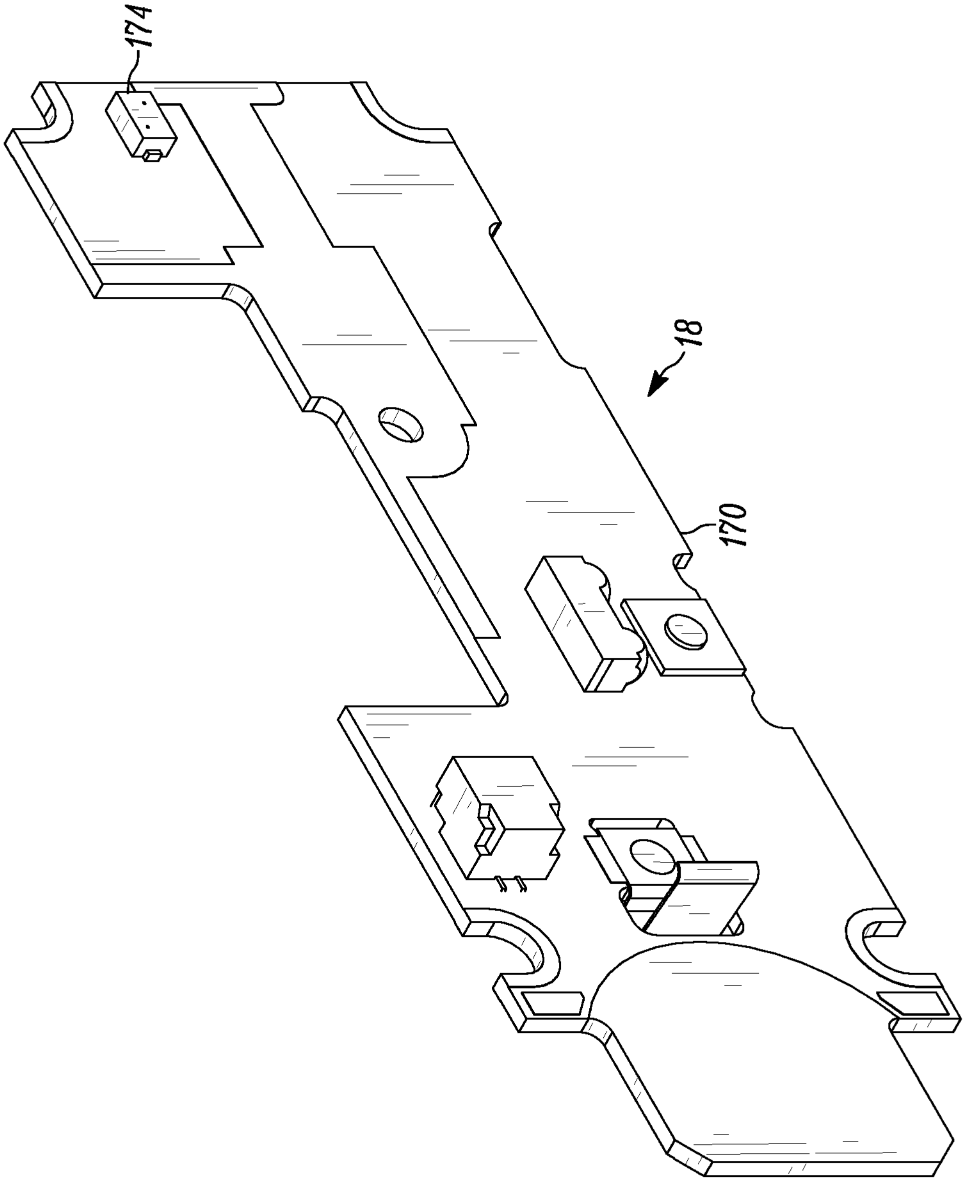
FIG. 21 of the drawings comprises a front perspective view of the PC board of the control assembly of the present disclosure.
Figure 22C:
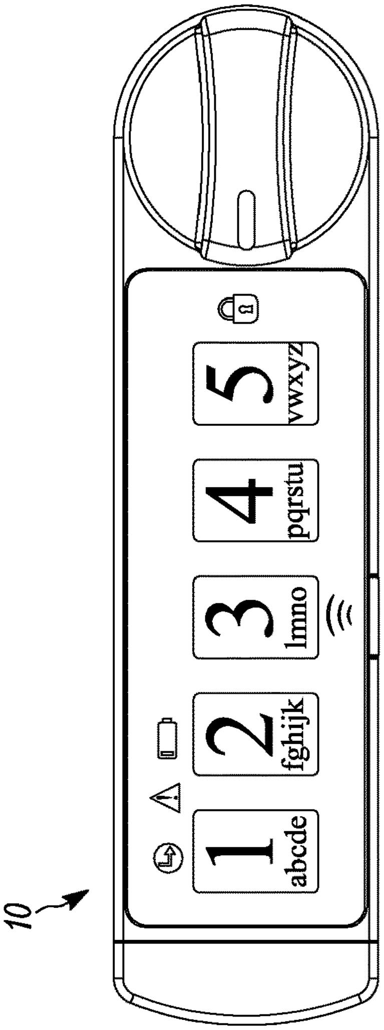
FIG. 22A through 22D of the drawings are top plan views of the lock of the present disclosure in four different orientations, a vertically upward orientation, a vertically downward orientation, a horizontal orientation in a first direction and a horizontal orientation in a second direction.
Figure 22D:
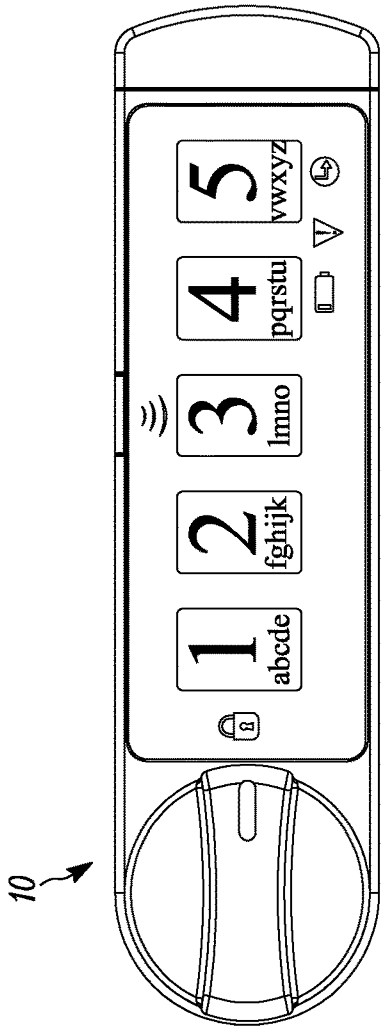
Figure 22B:
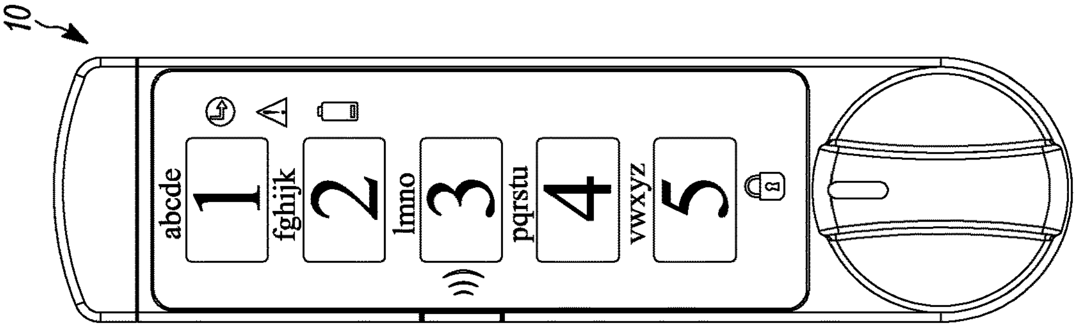
Figure 22A:
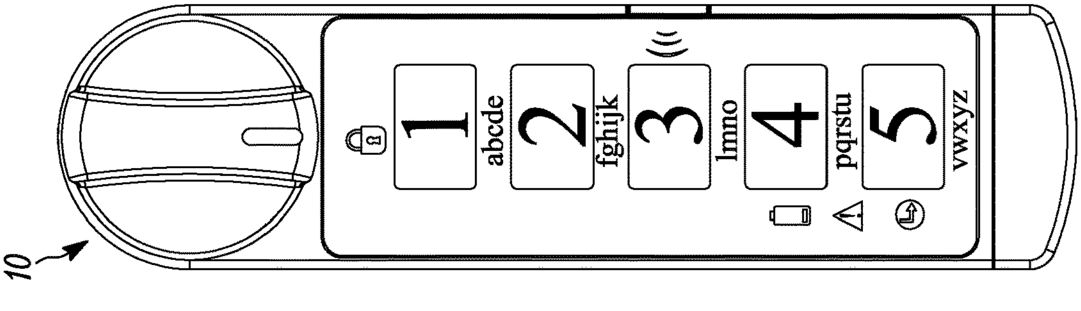

Referring now to FIGS. 20 and 21, the electronic control assembly 18 includes electronic PC board 170, input device 172, and latch position sensor 174. The PC board 170 includes the logic necessary to understand and process the signals coming from the input device 172 and the latch position sensor 174, so as to appropriately direct the actuation and direction of the motor 108. The configuration and design of such PC boards to achieve the desired functions set forth below are known to those of skill in the art. The input device 172 may comprise a keypad having a plurality of keys (in the embodiment shown, a total of five sequentially numbered keys). The input device 172 further includes a receiver for receipt of wireless signals (i.e., IR, RF, Bluetooth, zigbee, among others). More specifically, the keypad comprises an outer surface that has a thin-film metallic and polyester or polycarbonate surface configuration to resist damage and wear over the course of millions of cycles, and to provide resistance to solvents and chemicals, as well as to deter static charges (due to the relatively high dielectric strength). The combination of metallic and polyester properties on the outer surface can be provided by application of a metallic silver mirror ink on a polyester film to provide a low gloss look, textured surface with resistance to impact, scratching, scuffing, dents, ultraviolet light, and fingerprinting. Since the metallic surface is relatively thin (i.e., 150-200 micron) it may be applied by a printing process, and thus the keypad and the lock would be light-weight. The application of the metallic ink can be in a brushed or grain look running north-south or east-west. Below the outer surface a plurality of metallic conductive domes and conductive pads are provided to create the switch function.

The latch position sensor 174 is positioned in an orientation that is in a close relationship with position flange 115 (FIG. 12B) such that the sensor can determine the orientation and position of the latch relative to the housing assembly (and, as such, the knob). It is contemplated that the sensor is positioned on the PC board. The PC board is configured to reside within the main body cavity of the housing assembly.

It will further be understood that a position sensor can be configured to sense the position of the latch, which in turn, provides indirect feedback to detect at least two positions of the knob. Alternatively, a sensor can also detect one or more flags directly on the knob to detect at least two positions on the knob. The position sensor, it is contemplated may be of the optical type. To prolong the life of the battery, it is contemplated that the sensor intermittently detects the position and a change in position (i.e., a few milli-seconds every 1-2 second period). Of course, the sensor can be configured for a different intermittent interval, or may be configured for a continuous or generally continuous sensing.

In operation of the preferred embodiment, the lock is disposed in an operational environment, such as, for example, a desk. The housing assembly may be coupled to the furniture through any number of different means. It is contemplated that a double stick tape may be utilized on the cover 47 or fasteners may be extended through the furniture (or other structure in a different use) and into a corresponding bore of the housing assembly. In other embodiments, both double stick tape and threaded fasteners may be utilized. In addition, other means by which to couple the lock are contemplated. It will further be understood that the housing assembly can be mounted in any number of different orientations relative to the furniture bushing. For example, and as is shown in FIGS. 22A through 22D, the housing assembly may extend to the right or left, or vertically upward or downwardly. Other orientations (i.e., angular) are likewise contemplated.

Initially, with reference to FIGS. 12A and 12B, portions of the lock are shown in the locked configuration. In such a configuration, the blocker is in the blocking position, at the locked end of the blocker channel. The latch 102 is positioned within the latch channel with the distal end 112 of the latch 102 biased by the biasing member 114 into the axial notch 84 of the knob 70. The latch is precluded from slidable movement within the latch channel 40, as the blocker is positioned so as to extend through the latch channel and limiting the slidable movement of the latch within the latch channel. In some embodiments, the proximal end 110 of the latch 102 abuts the latch engagement body 124. In other embodiments, the biasing member 114 maintains a small separation between the latch and the blocker. Regardless of the interface, the blocker precludes the movement of the latch so that the distal end of the latch remains within the axial notch 84.

Figure 19A:
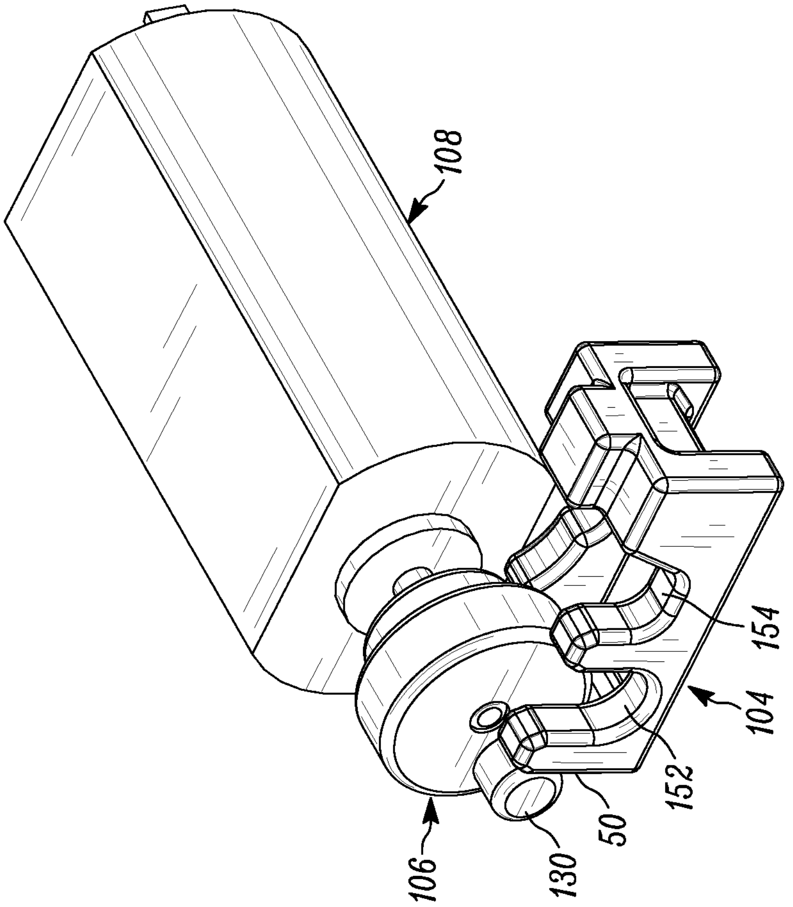
FIGS. 19A through 19E comprise sequential perspective views of the blocker, the cam and the motor as the cam and blocker move from the locked position to the unlocked position.

Additionally, in the locked configuration, the cam 106 is rotated such that the first follower 130 engages the first cam profile at the first slot 150. At the same time, the second follower engages the first ramp 156. Such a configuration is also shown at FIG. 19A with respect to the motor, cam and blocker. As will be explained below, the sequence of moving the blocker from a locked position to an unlocked position is achieved through rotation of the cam through approximately one and one half revolutions (although variations are contemplated which require lesser or greater revolutions of the cam and the motor.

To unlock the lock so that the locking flange 76 can be rotated, the user must direct the PC board to initiate an unlocking procedure. In one embodiment, a particular code or combination of keys is depressed in a particular combination to provide the necessary authorization to the electronic control assembly. In other embodiments, a wireless signal may be sent to the PC board via the input device 172. Regardless of the method of communicating the proper combination or code for initiating the unlocking procedure, once the procedure is initiated, the position of the latch is determined through sensor 174, and the motor is actuated.

Figure 19B:
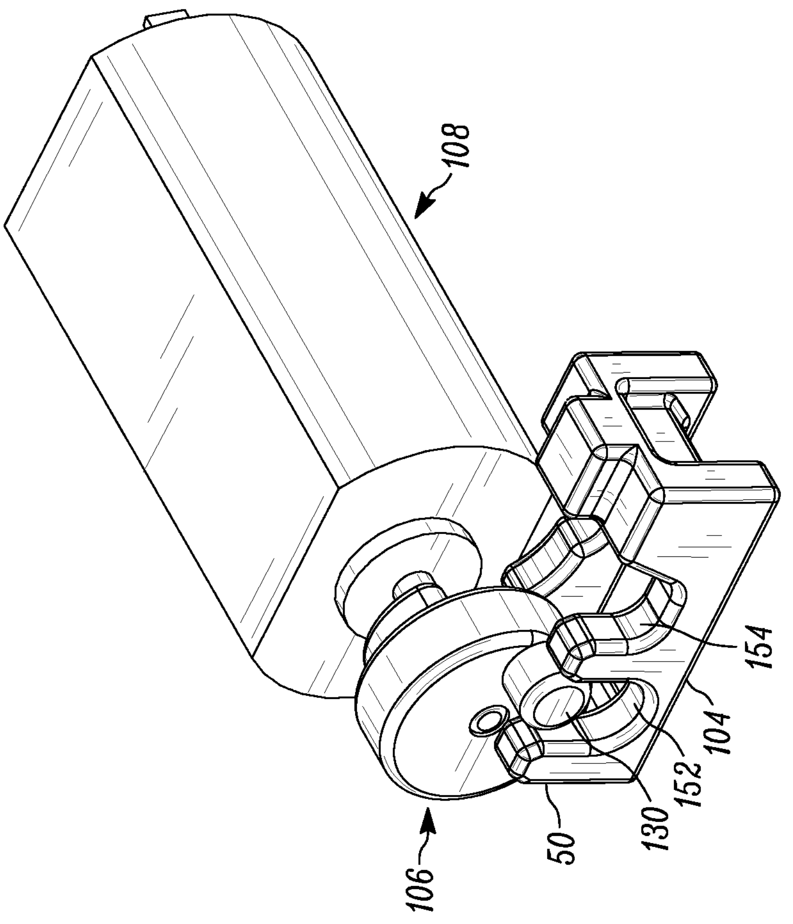
Figure 19C:
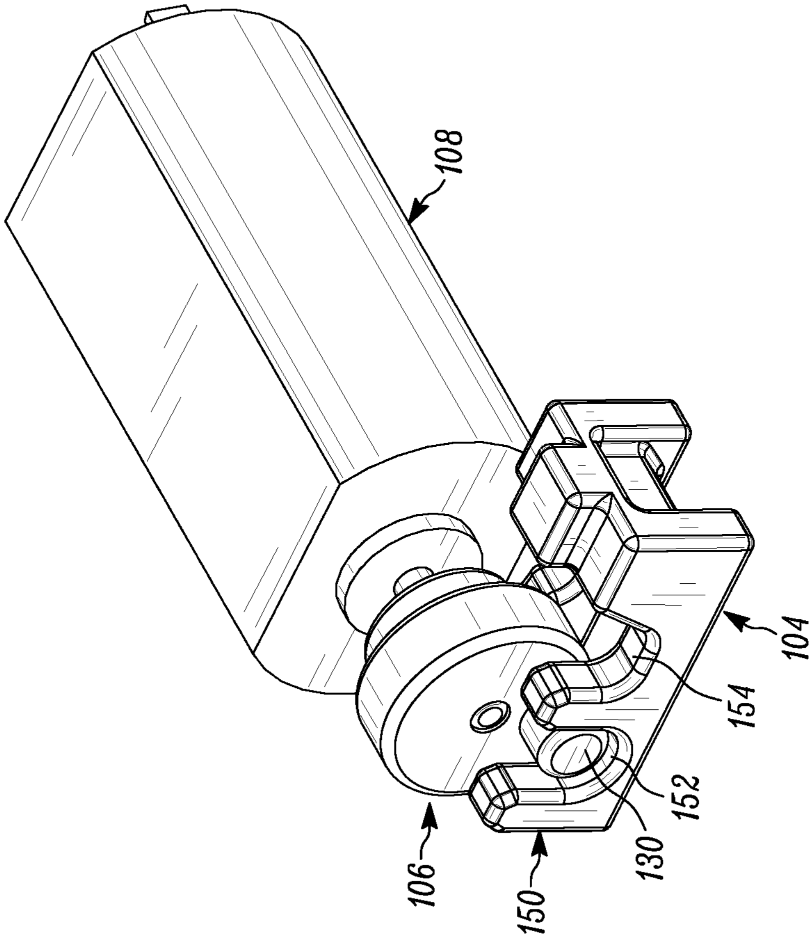
Figure 19D:
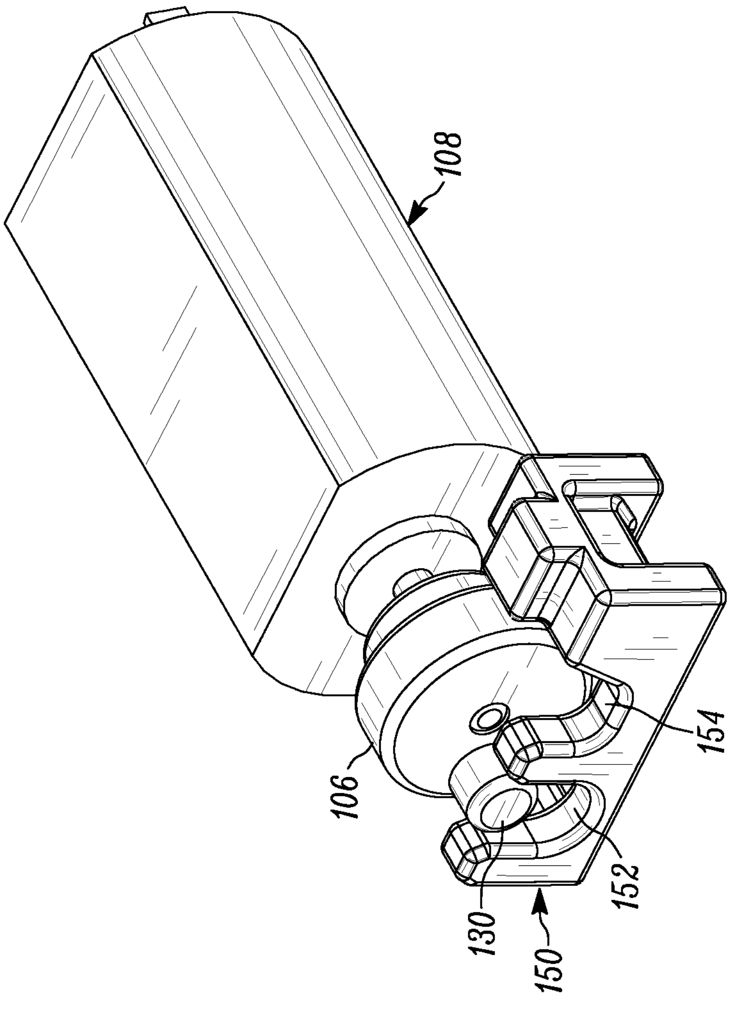

When the motor is actuated in a first direction, the cam 106 rotates in a first direction disengaging the first follower 130 from the first slot 150 (FIGS. 19A and 19B), the motor continues to rotate, and the first follower 130 eventually enters into the second slot 152 (FIG. 19B). Eventually, the continued rotation of the cam 106 with the first follower 130 positioned in the second slot 152 begins to translate the blocker 104 along the blocker channel 42 (FIGS. 19C and 19D). It will be understood that, advantageously, the cam 106 rotates through an arcuate distance prior to engaging the first cam profile with force being directed upon the blocker in a translating direction. In the embodiment shown, the cam 106 rotates through about a half turn prior to initiating the translation of the blocker. Advantageously, the motor is allowed to initiate rotation without load, such that momentum can be built up, which momentum is sufficient to initiate translation of the blocker. Such a momentum building, relatively load free, initiating step removes the need to utilize a gear train to reduce the speed of the cam or to increase the torque applied by the cam. Rather, a direct drive of the cam by the motor (which greatly simplifies the construction) can be utilized.

Figure 19E:
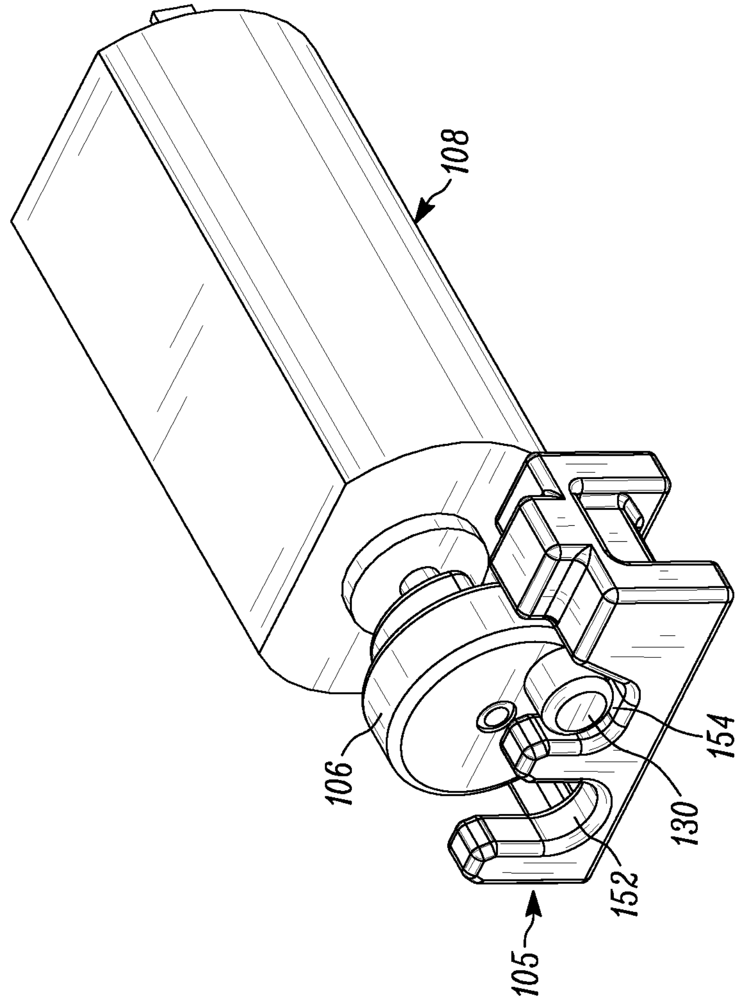

As the rotation of the cam 106 continues, eventually, the blocker continues to translate due to the interaction of the first follower 130 within the second slot 152 of the first cam profile. Eventually, the first follower 130 reaches a point, as does the blocker 104 wherein the first follower 130 no longer exerts a force on the blocker 104 to translate further (FIG. 19D). Shortly thereafter, the first follower 130 exits from the second slot 152 and continued rotation directs the first follower 130 into the second slot. When the first follower 130 is fully inserted into the second slot, further movement is precluded (FIG. 19E). The PC board senses that the first follower is in such a position (i.e., through a sensing of the draw of the motor, or through other means, such as a sensor or the like). The PC board then directs the motor to cease rotation. In another embodiment, a timer can trigger the motor circuit to de-energize the motor. It will also be understood that the cam follower 132 interacts with the second cam profile, and the ramps in order to retain the blocker in proper alignment with slots 152, 154, when the follower is outside of the slots 152, 154, and also prior to entry into these slots.

The blocker is now in the unlocked orientation shown in FIGS. 13A and 13B. That is, the blocker is moved out of the path of the latch channel, and the latch can be slidably moved within the latch channel. The engagement of the cam 106 with the third slot 154 and the interaction of the second follower 132 with the second cam profile, maintains the blocker in the unlocked configuration.

In such a configuration, and with reference to FIG. 13A?, the user can initiate rotation of the knob 70 to move the locking flange into an unlocked position. As the user initiates rotation of the knob 70, the first surface 83 or the second surface 85 (depending on the direction of rotation being clockwise or counterclockwise) imparts a force on the distal end 112 of the latch 102. The two surfaces are angled such that the imparting of force includes a force component in the longitudinal direction of the latch 102. In turn, the continued rotation of the knob pushes the latch 102 out of the axial notch, overcoming the biasing means. There is no blocker to preclude the slidable movement of the latch, and, as such, the knob can force the latch out of the way so that the latch does not preclude movement of the knob. As the knob is further turned, unimpeded, the locking flange can be moved into an unlocked position.

Due to the biasing member 114, the distal end 112 of the latch 102 is directed toward the knob. In the unlocked condition, the distal end of the latch remains in contact with the dependent skirt 82 of the knob 70. At the same time, the blocker 104 is maintained by the cam 106 in the unlocked position to preclude interference with or impeding of the latch.

To relock the lock, the user turns the knob back so as to direct the lock flange 76 into the locked position. Eventually, the knob is returned to an orientation wherein the axial notch 84 of the knob aligns with the latch 102, and the distal end of the latch extends into the axial notch 84. In the embodiment shown, the position sensor 174 (FIG. 24) in cooperation with position flange 115 senses the position of the latch within the axial notch. In such an orientation, the latch has travelled toward the knob such that the distal end thereof is outside of the blocker channel 42.

Next, the motor is activated again, by the electronic control 18, in the opposite direction from the direction of rotation during unlocking. The steps shown in FIGS. 19A through 19E are carried out in reverse. Namely, the cam 106 is rotated by the motor, and the first follower 130 exits the third slot, extends over the second ridge 153 and enters the second slot 152 (FIGS. 19E and 19D). Continued rotation imparts a force upon the blocker having a component in the direction of the locked position and the blocker slidably moves toward the locked position along the blocker channel (FIG. 19C). Eventually, the blocker reaches a translated position wherein the cam 106 no longer slidably moves the blocker (FIG. 19B). In such a position, further rotation of the cam 106 directs the first follower 130 to exit the second slot, traverse over the first ridge 153 and returns to first slot 150 (FIG. 19A).

Similar to that which was explained above with respect to the unlocking procedure, during the locking procedure, the cam 106 rotates an arcuate distance without the first follower 130 imparting a force on the first cam profile of the blocker. As such, the cam can gather speed, and in turn, momentum, such that when the cam enters the second slot 152, the cam has sufficient force to impart onto the blocker to translate the blocker. Such an intermittent contact with the first cam profile, and intermittent application of a translational force allows for the use of a directly driven cam, and a motor smaller than would otherwise be required. Furthermore, the consumption of power from the battery is reduced for each cycle as compared to a rack and pinion with constant engagement and application of force therebetween.

Once in the first slot 150, the cam 106 is precluded from rotation as the blocker has reached the locked position (i.e., the end of travel of the blocker along the blocking channel). Thus, while rotation is precluded, the motor continues to impart a rotational force on the cam 106, thereby increasing the power draw. The electronic control 18 realizes the increased power draw by the motor as a signal that the blocker has returned to the locked position. In turn, the power to the motor ceases.

In this position, the blocker 104 is in a position that precludes slidable movement of the latch sufficient to move the latch out of the axial notch 84 to allow rotation of the knob 70. Any rotation of the knob by the user will translate to translative movement of the latch into contact with the blocker which will stop the movement of the latch while the distal end remains in the axial notch 84.

It will be understood that the electronic control 18 may be programmed in any number of different manners. In addition to the operation above, other operation configurations are contemplated. For example, in a setting such as a locker room, it is desirable for each user of a locker to be able to input his or her own code for each use. As such, while the mechanical locking and unlocking steps are the same as disclosed above, the blocker movement is initiated by differing conditions.

More particularly, initially, the locker may be closed and the lock flange may be in the locked configuration. However, the blocker may be in the unlocked position, thereby allowing the rotation of the knob 70. Once the knob 70 is rotated and the lock flange 76 is in the unlocked position, the latch is driven out of the axial notch and the position sensor 174 senses that the latch has been moved out of the axial notch.

At such time, the operation may direct the user to input a new unlocking key sequence on the keypad of the input device. This input sets the code for the operation of the lock through the next cycle. Once the code is input, the electronic control is programmed to execute the locking procedure the next time that the knob is rotated into a locked position and the latch is biased into the axial notch 84. More specifically, the motor is activated and through the cam 106, the blocker is translated into the locked position.

To re-unlock the lock, the user must provide the authorization through an unlock code (or another code to over-ride the communication to the electronic control). Once the code is provided, the motor is activated in the other direction, translating the blocker to the unlocked position. At the same time, the electronic control is ready for another cycle. That is, the electronic control is ready to receive a new code from the user through the input device. As such, a new code is applied each time the lock cycles between the locked and unlocked configuration.

It may, from time to time, be necessary to service the lock. To service the lock the knob is first removed from the housing assembly. As explained above, a set screw or multiple set screws, maintain the engagement of the knob 70 and the lock driver 72. The set screw is accessible through the opening on the second end of the housing, but only when the knob 70 is in a particular rotative position to line up the set screw with the opening. It will be understood that, to preclude access to the set screw, except when the blocker is in the unlocked position, the opening and the set screw are not in alignment when the knob is in the locked condition.

As can be seen in the figures, the lock is configured to extend through a bushing (also referred to as a shell) held by a cabinet or enclosure (not shown). The actuatable lock assembly is configured can be connected and disconnected from the bushing. Advantageously, a portion of the actuatable lock assembly is within the cabinet or enclosure with a portion of the actuatable lock assembly outside of the cabinet or enclosure, when coupled to the bushing. The latching assembly as discussed above is positioned within a housing assembly. The housing assembly extends along the outside of the cabinet or enclosure.

The actuatable lock assembly includes a longitudinal axis that generally corresponds to the axis of rotation thereof (although not required). The housing assembly likewise includes a longitudinal axis. The longitudinal axis of the actuatable lock assembly is substantially perpendicular to the longitudinal axis of the housing assembly.

Figure 23:
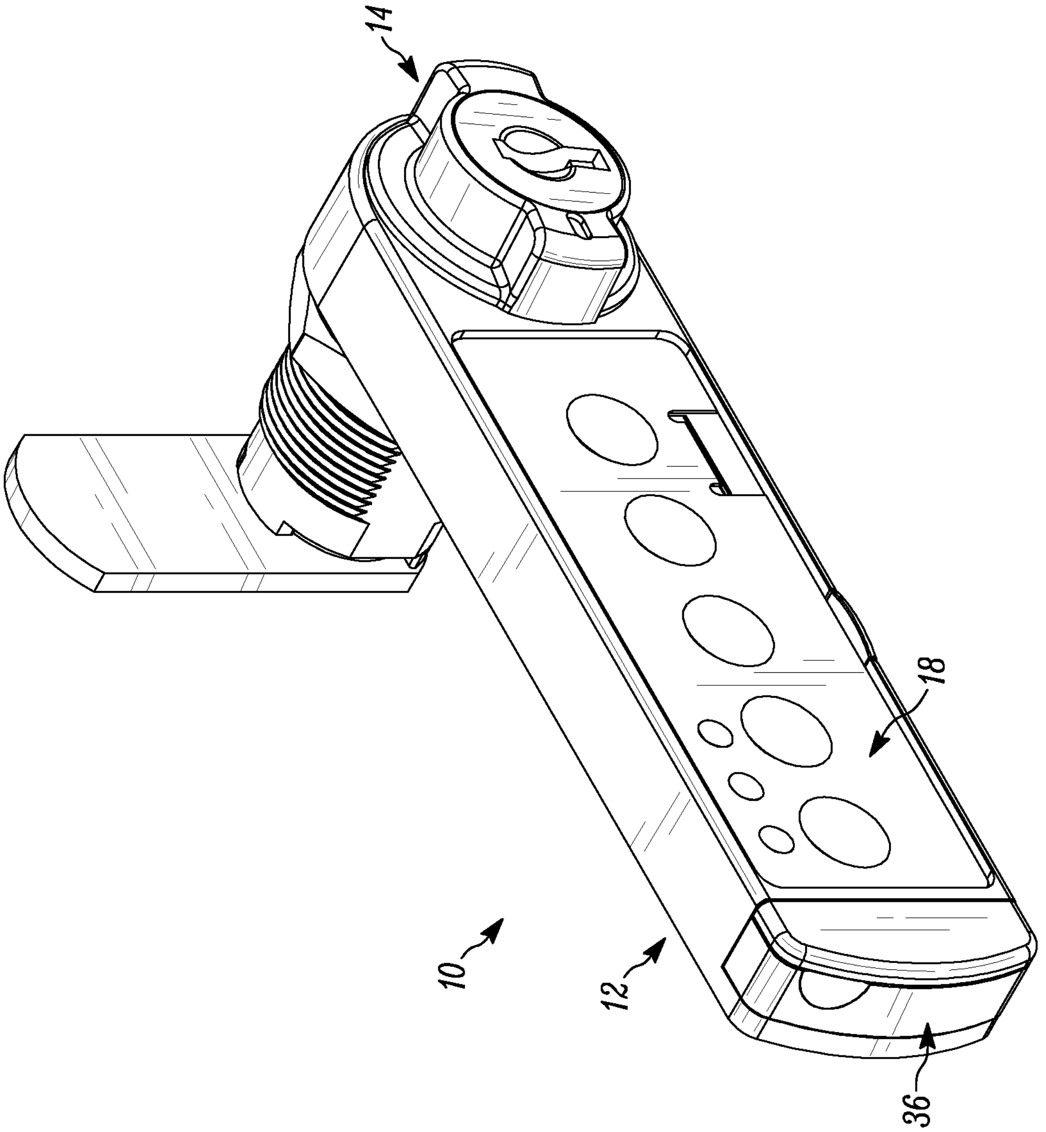
FIG. 23 of the drawings is a perspective view of an alternate embodiment of the lock, showing, in particular, an actuatable lock member having a mechanical key over-ride.
Figure 24:
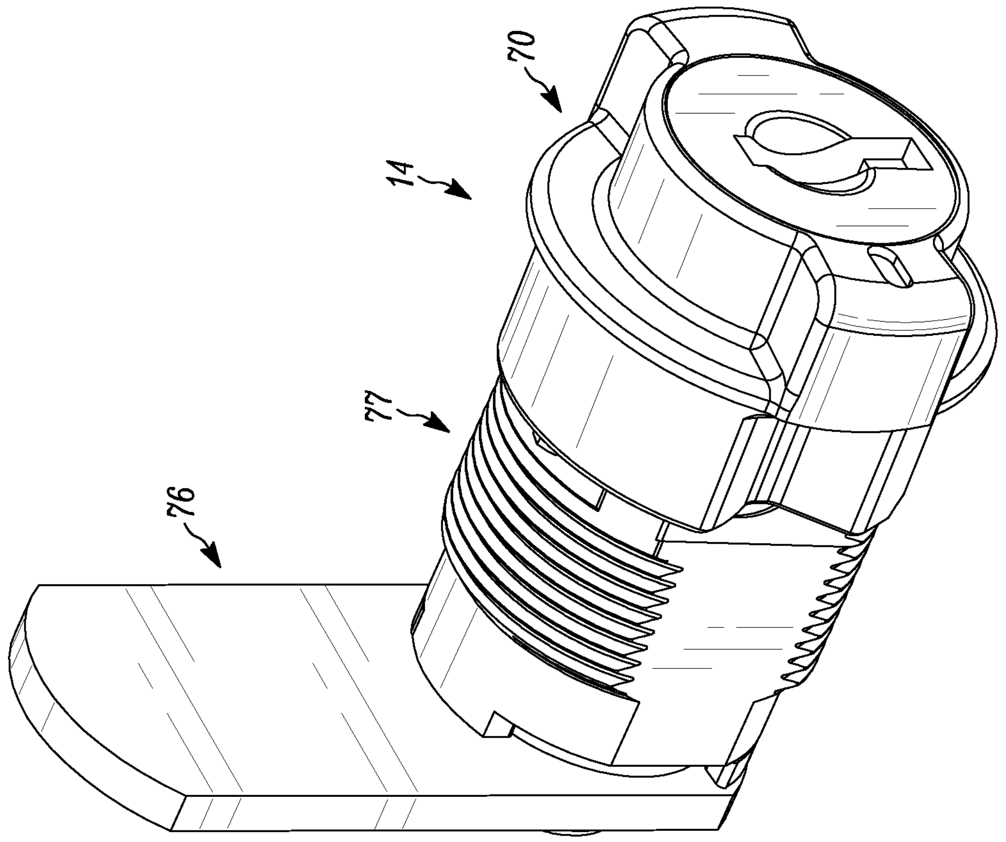
FIG. 24 of the drawings is a perspective view of an alternate embodiment of the actuatable lock member of the type shown in FIG. 27A with a key inserted therein.

In the embodiment shown in FIGS. 23 and 24, a key override can be provided to over-ride the electronic locking function. In such an embodiment, a lock core controlled by a mechanical key can be integrated into the actuatable lock assembly 14. Such a configuration allows the lock to be unlocked even if the blocker is in the locked position, precluding slidable movement of the latch along the latch channel. Insertion and turning of the mechanical key in the lock core allows the tumblers in the lock core to retract and allow the core to rotate. The lock flange rotates with the key while the knob remains in its locked configuration, due to the latch and blocker position. In a related embodiment, the rotating of the lock core causes movement to the blocker so that the latch can be freely moved out of the axial notch of the knob to allow functional rotation of the knob. It is also contemplated that a mechanical key over-ride mechanism could be rotated in order to move the latch relative to the channel, and/or out of engagement with the knob, or to move the blocker out of the channel of the latch.

Figure 25:
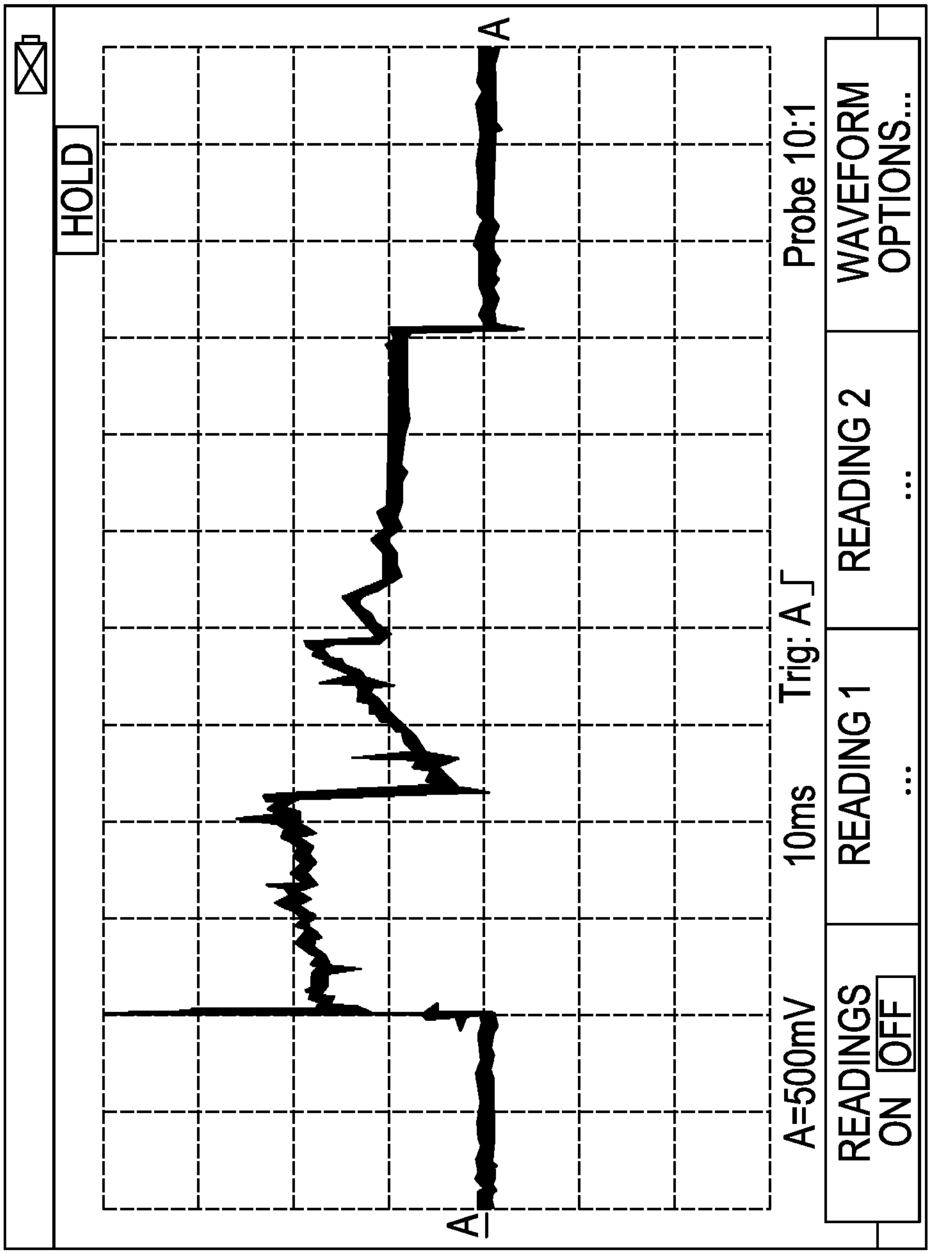
FIG. 25 of the drawings is a graphical representation of the current by the motor as measured through the unlocking cycle.
Figure 26:
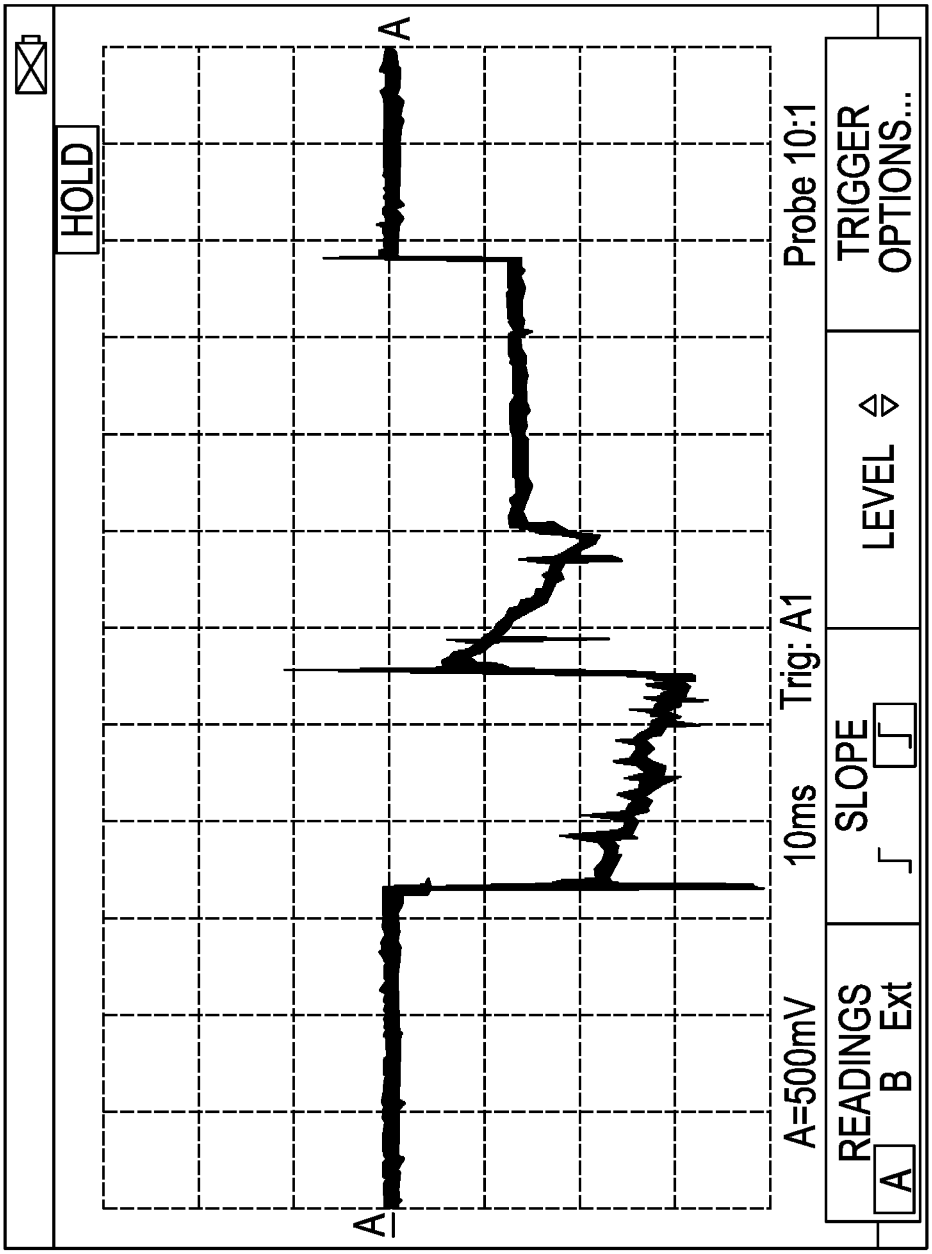
FIG. 26 of the drawings is a graphical representation of the current draw by the motor as measured through the locking cycle.

Referring now to FIGS. 25 and 26, a graph is shown of the current waveform of the motor 108 during operation. In particular, FIG. 25 shows the current waveform to accomplish the translation of the blocker from the locked position to the unlocked position. The current waveform has multiple slopes of increasing and decreasing current through the translation of the blocker. First, when the motor is initiated, there is an inrush of current, to overcome the inertia and to begin rotation. Next, the current decreases as the cam 106 continues to rotate and accelerate from a resting position to a position where the first follower reaches the second slot 152. As the continued rotation initiates translation of the blocker, the current decreases abruptly. The current begins another increasing slope as the blocker translates across to the unlocked position. As the rotation of the cam continues, the first follower 130 exits the second ramp, causing a quick drop in current draw, with the current draw entering another increasing slope as the speed of the cam increases without resistance toward and into the third slot 154. Finally, as the first follower reaches the end of the third slot 154, the current drops to a to a steady draw in an effort to cause further rotation (i.e., substantially flatlines). It is the sensing of this relatively steady current draw that signals to the electronic control assembly that the blocker has reached the unlocked configuration.

The opposite is shown in FIG. 26, wherein a waveform for the motor is shown for a locking operation. In particular, the waveform is inverted, and transitions through the same regions (although, as the motor operates in the opposite direction, the current is in the opposite direction). Again, when the end of travel is reached, the current reaches a substantially steady draw which triggers the electronic control assembly to cease rotation of the motor, as the blocker has reached the locked configuration. The two FIGS. 25 and 26 show the intermittent nature of the contact between the blocker and the cam, thereby showing how the overall use of power is not continuous, but that it varies throughout the cycle. While variations in the actual current draw will be seen depending on a number of variables, the general configuration of a spike when movement of the cam is initiated, followed by a sloped change of increased current draw during rotation of the cam without coacting with the blocker to effectuate translation of the blocker, followed by a drop in current draw when contact is made with the blocker and force is imparted upon the blocker to translate across the blocker channel, followed by another drop in current draw when the blocker reaches the end of translation, and the first follower is free to rotate without imparting force upon the blocker, followed by an increase in current draw as the cam accelerates, finally followed by a drop and a flatline when the end of rotation of the cam is reached with the first follower positioned at the end of the final slot (slot 150 when reaching the locked orientation and slot 154 when reaching the unlocked configuration).

Figure 27A:
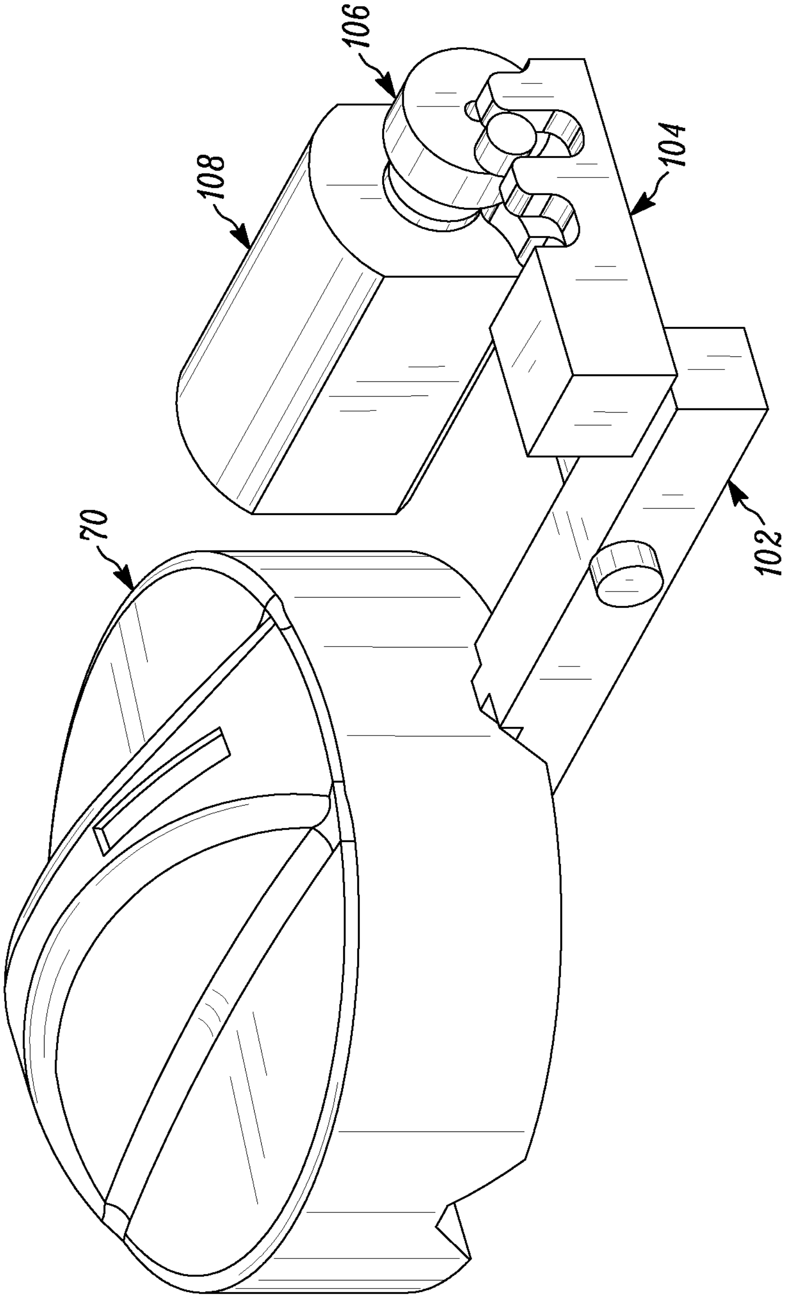
FIG. 27A of the drawings is an alternate embodiment of the latch assembly and the knob of the actuatable lock assembly of the present disclosure, in the locked position.
Figure 27B:
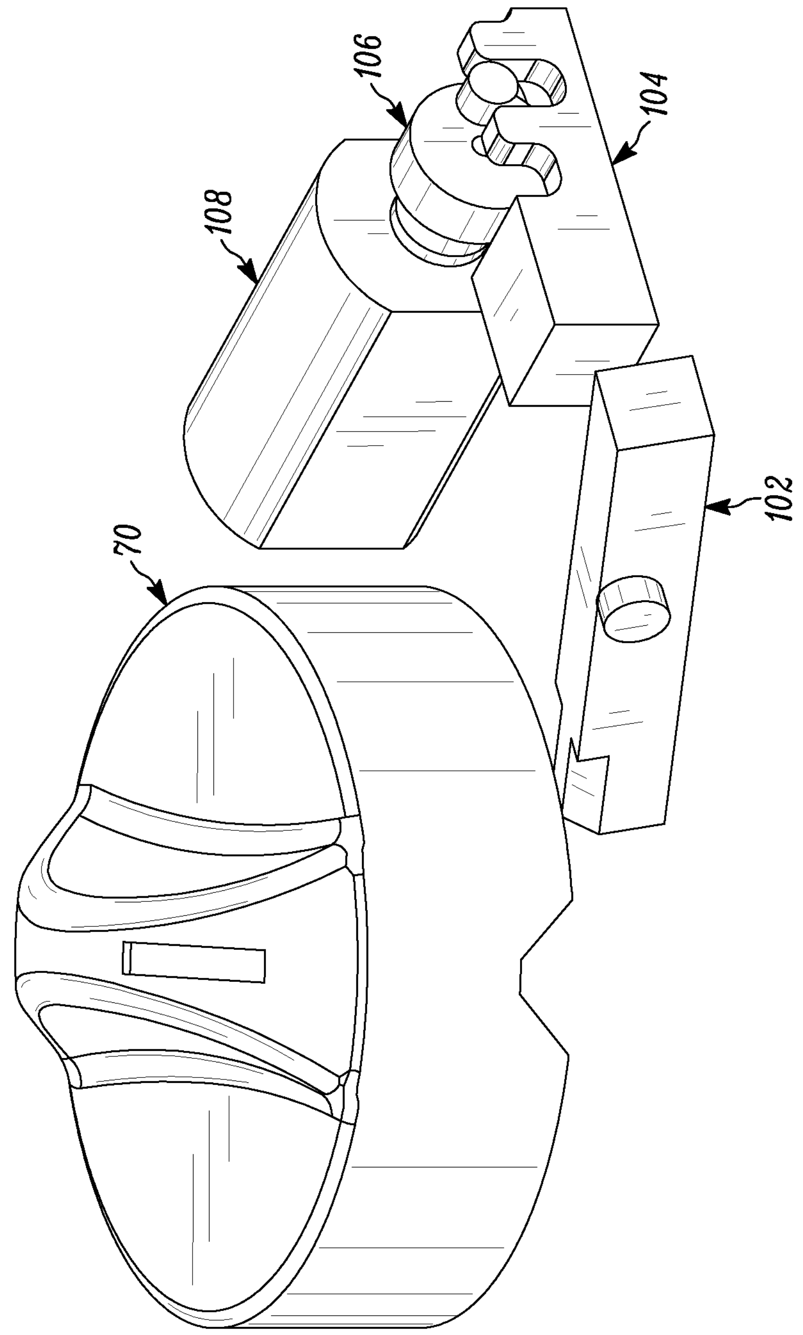
FIG. 27B of the drawings is an alternate embodiment of the latch assembly and the knob of the actuatable lock assembly of the present disclosure, that is shown in FIG. 27A, in the unlocked position.

It will be understood that variations to the structure of the latching assembly are contemplated. For example, and with reference to FIGS. 27A and 27B, a variation is contemplated wherein the operation of the blocker remains the same in that the blocker translates within a blocker channel. However, the latch rotates about an axis of rotation that is positioned between the proximal and distal ends. The axis of rotation is further substantially parallel to the blocker channel, and spaced apart therefrom. The knob in such an embodiment has a downwardly opening notch in the dependent skirt which interfaces with the distal end of the latch.

In the locked configuration, the latch is biased so that the distal end is rotated about the axis of rotation into the downwardly opening notch. The blocker extends over the proximal end of the latch precluding rotation about the axis of rotation, thereby maintaining the latch in the downwardly opening notch. When the blocker is moved to an unlocked position, the blocker is spaced apart from the latch, and the latch is free to be rotated about the axis of rotation. Thus, when the knob is rotated, the shape of the downwardly opening notch imparts a downward force upon the latch driving the latch out of the notch and allowing free rotation of the knob. The opposite sequence is performed to again return the blocker to the locked position.

Figure 28A:
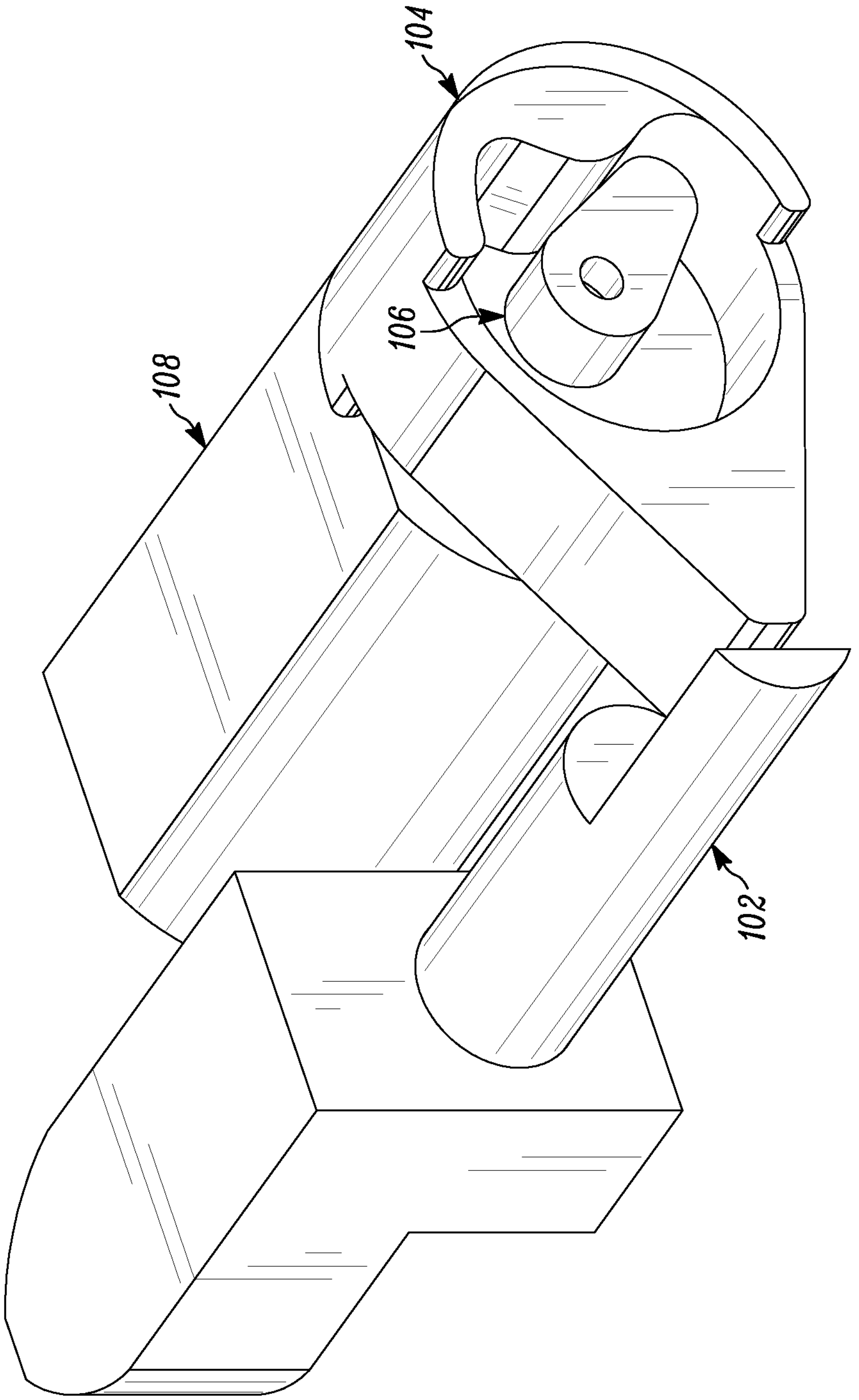
FIG. 28A of the drawings is an alternate embodiment of the latch assembly of the present disclosure, in the locked position.
Figure 28B:
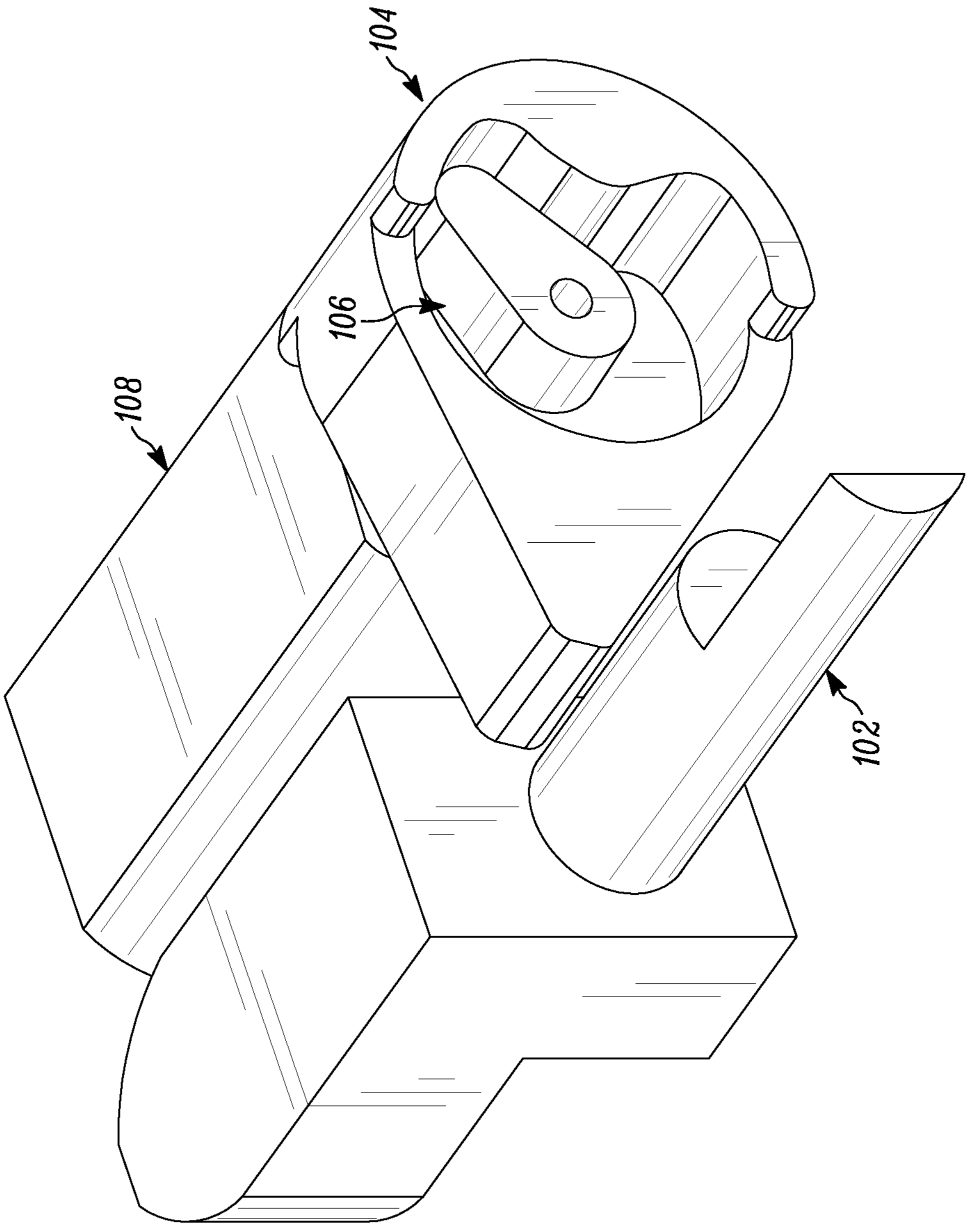
FIG. 28B of the drawings is an alternate embodiment of the latch assembly of the present disclosure, that is shown in FIG. 28A, in the unlocked position.

With the embodiment of FIGS. 28A and 28B, a rotationally movable blocker is contemplated. In such an embodiment, the rotational blocker includes a first cam profile within a cavity of the blocker, and a lobe extending on an outer surface thereof. The lobe interfaces with the proximal end of the latch. The cam 106 is positioned within the cavity of the blocker so that rotation of the motor interfaces the first follower of the cam with the first cam profile of the blocker. As such, when rotated in a first direction, the first cam follower freely rotates relative to the blocker until the first stop is reached. At such time, continued rotation of the first cam follower rotates the blocker, as shown in FIG. 28B. The rotation of the blocker, eventually moves the blocker out of the way of the latch. The latch is then free to slidably move within a latch channel.

To return the device to the locked orientation, the cam 106 is rotated in the opposite direction relative to the blocker until the second stop is reached. When the second stop is reached, the continued rotation of the cam by the motor rotates the blocker, returning the blocker into a position that interfaces with the proximal end of the latch. As such, the blocker precludes slidable movement, which, in turn, precludes rotation of the knob that interfaces with the distal end of the latch.

Figure 29A:
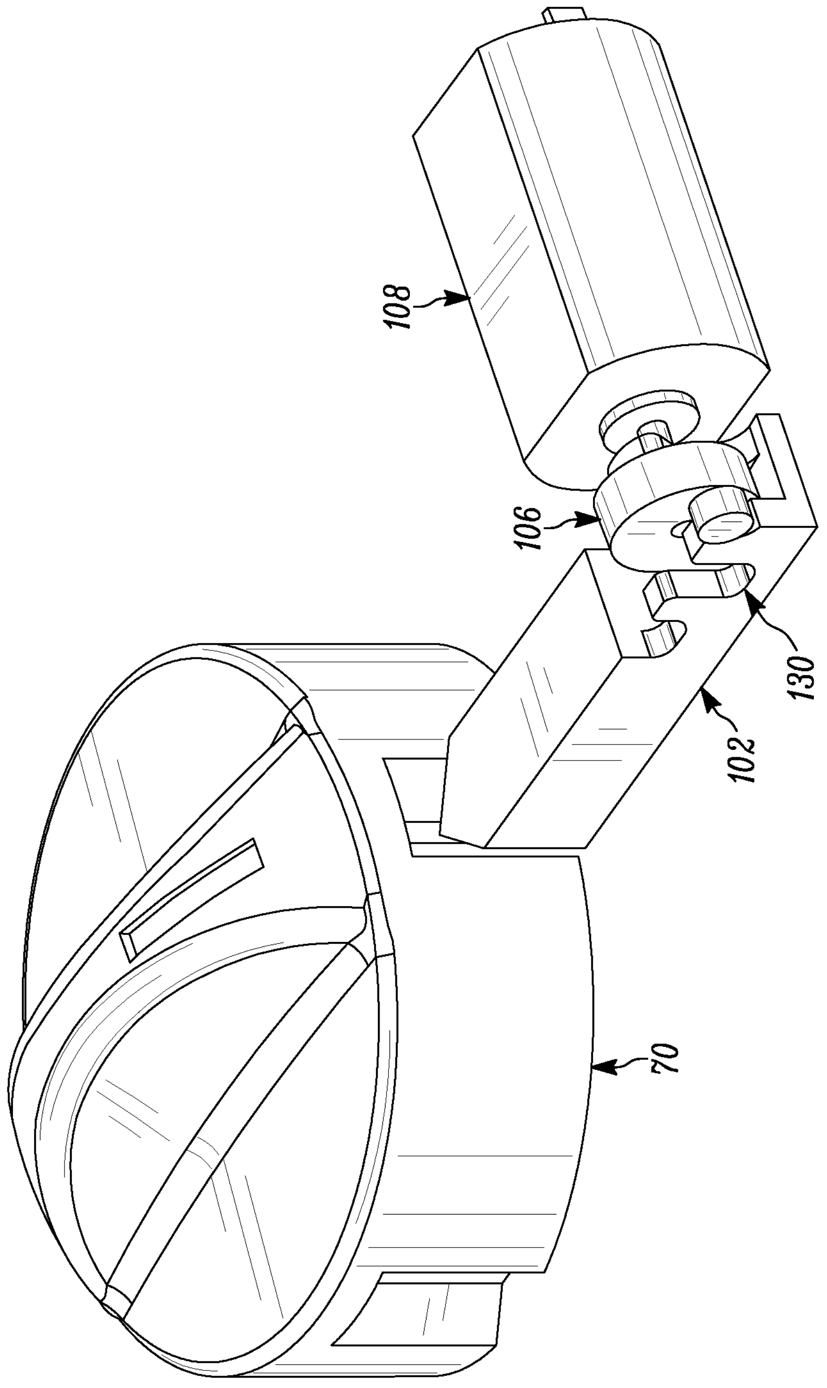
FIG. 29A of the drawings is an alternate embodiment of the latch assembly of the present disclosure, in the locked position.
Figure 29B:
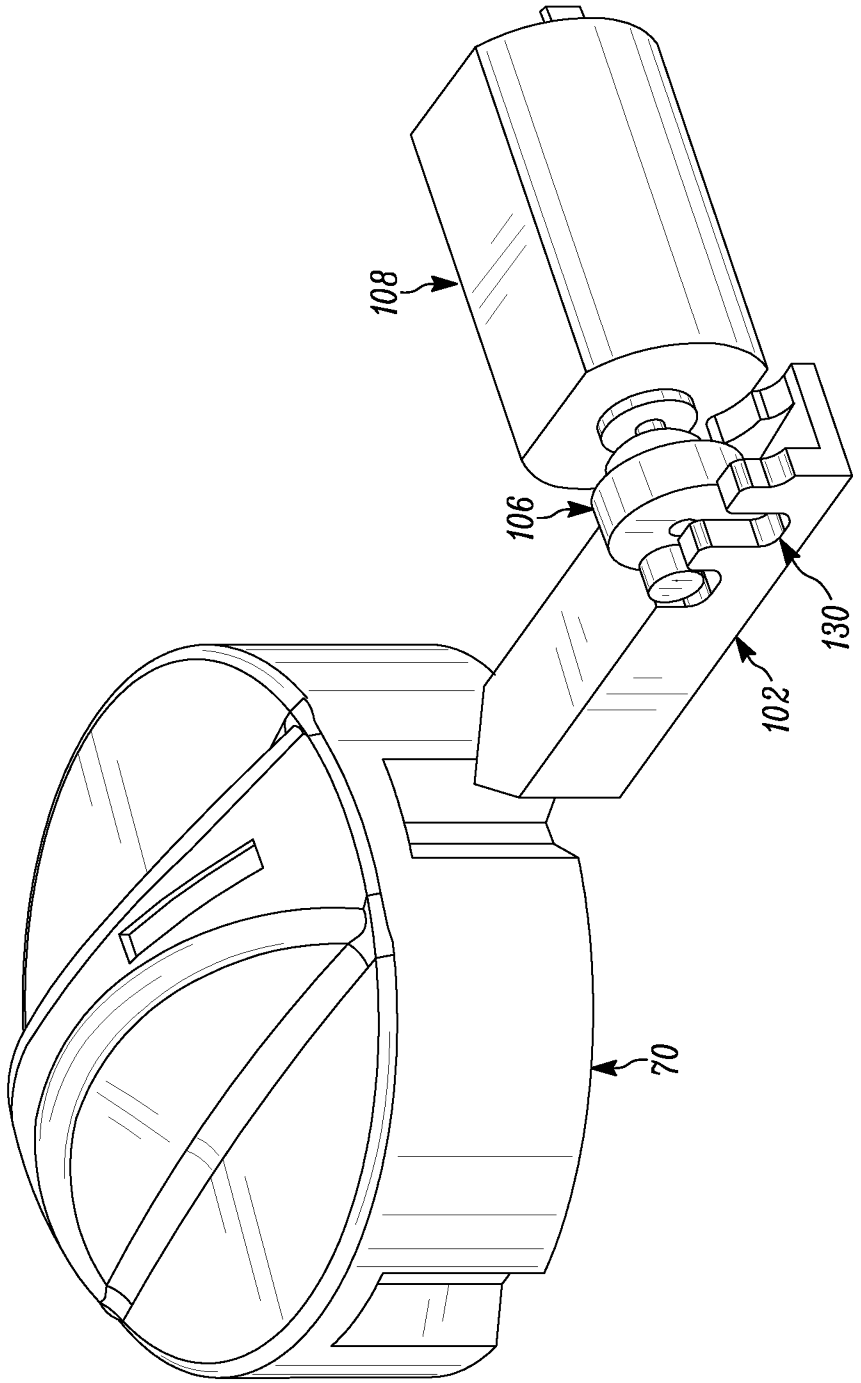
FIG. 29B of the drawings is an alternate embodiment of the latch assembly of the present disclosure, that is shown in FIG. 29A, in the unlocked position.
Figure 29C:
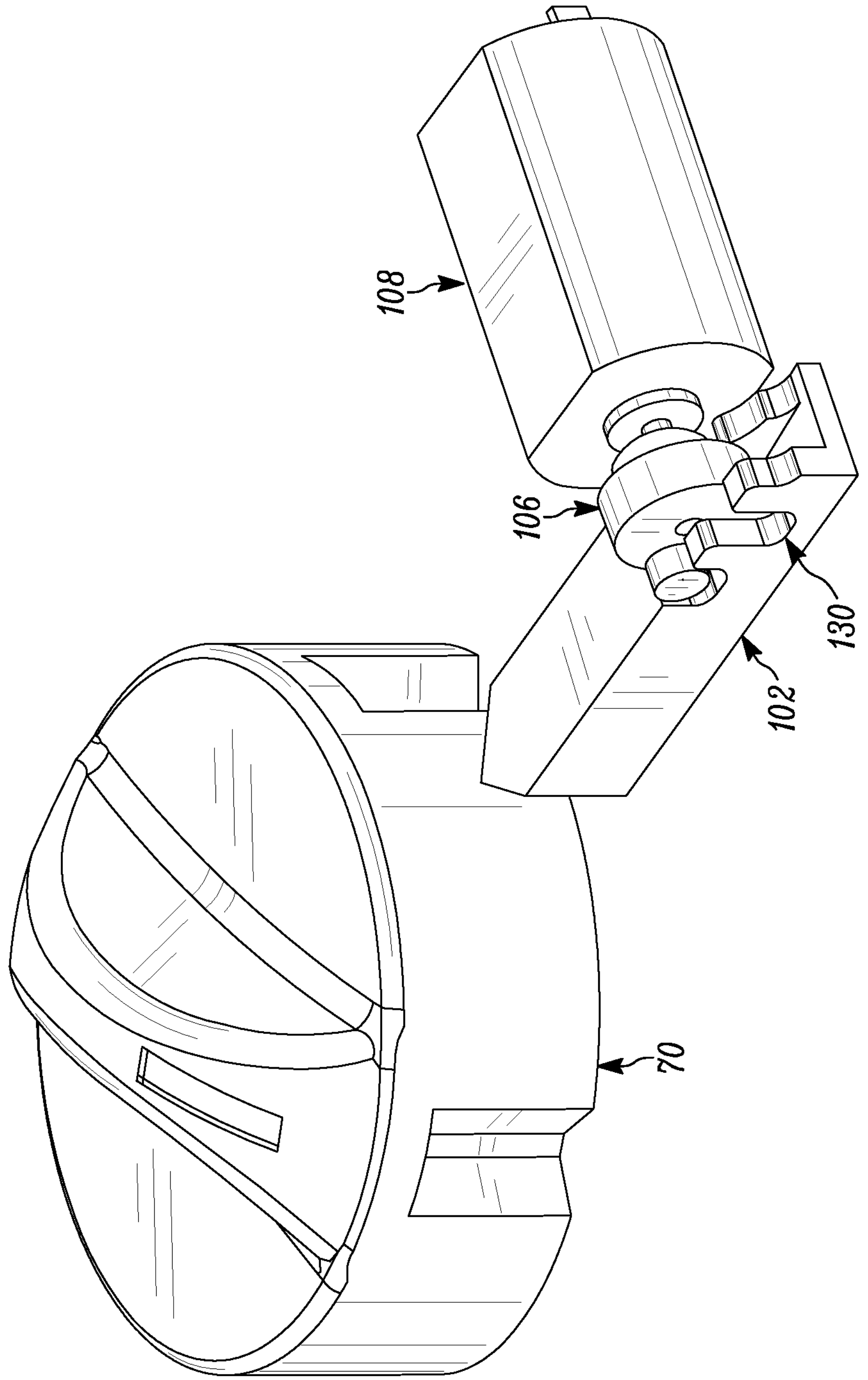
FIG. 29C of the drawings is an alternate embodiment of the latch assembly of the present disclosure, that is shown in FIG. 29A, in the unlocked position, with the knob rotated relative to the knob position in FIG. 29B.

In yet another embodiment, shown in FIGS. 29A through 29C, the blocker function and the latch function can be integrated into a single element. That is, the distal end of the latch can be configured to include the first cam profile and the second cam profile that was on the blocker. The cam profiles are in the direction of translation of the latch, as opposed to being perpendicular thereto in the other embodiments. The cam and the motor are rotated so that the cam can interface with the first and second cam profiles. In turn, actuation of the motor directly moves the latch.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A lock comprising:

a housing;

a latching assembly positioned within the housing, the latching assembly movable between a locked and an unlocked position through electronic actuation;

a knob at least partially positionable within the housing, and interfaceable with the latching assembly, the knob having at least one notch;

a lock driver coupled to the knob, a portion of the lock driver being outside of the housing;

a latch positioned within the housing, associated with the latching assembly and positionable between a first position within the at least one notch and a second position out of the at least one notch, the latch being biased toward the first position so as to at least partially rest within the at least one notch, wherein, when in a locked configuration, the latching assembly precludes the latch from moving between the first position to the second position, and when in an unlocked configuration, the latching assembly allows the latch to move away from the first position to the second position, and when in the unlocked configuration, movement of the knob facilitates the movement of the latch toward the second position.

2. The lock of claim 1 wherein the at least one notch comprises opposing inwardly sloped surfaces that extend radially inwardly on the knob.

3. The lock of claim 2 wherein the inwardly sloped surfaces meet at a vertex.

4. The lock of claim 1 wherein the knob includes a dependent skirt, the at least one notch comprises opposing inwardly sloped surfaces that extend radially inwardly on the knob.

5. The lock of claim 1 wherein the latch includes a distal end that is positionable within the at least one notch, the distal end having a shape generally corresponding to the shape of the at least one notch.

6. The lock of claim 5 wherein the latch includes a proximal end that interfaces with the latching assembly.

7. The lock of claim 5 wherein the distal end of the latch includes opposing sloped surfaces.

8. The lock of claim 1 wherein the latch is biased toward the extended position through a compression spring extending between the housing and the latch.

9. The lock of claim 8 wherein the compression spring extends around at least a portion of the latch.

10. The lock of claim 1 wherein the housing includes a knob cavity configured to receive at least a portion of the knob, and a cavity to receive the latching assembly.

11. The lock of claim 10 wherein the knob further includes at least one spring loaded ball biased axially outwardly to interface with the knob cavity.

12. The lock of claim 11 wherein the at least one spring loaded ball further comprises an opposing pair of spring loaded balls biased axially outwardly.

13. The lock of claim 11 wherein the knob cavity includes detents adapted to cooperate with the at least one spring loaded ball.

14. The lock of claim 1 wherein the knob further comprises a second notch, wherein the latch extends to the first position to at least partially extend into the second notch.

15. The lock of claim 1 further comprising a motor coupled to a cam, and positioned within the housing, whereupon actuation of the motor causes rotation of the cam, to, in turn, affect movement of the latch, to allow movement of the latch out of the locked position or to preclude movement of the latch out of the locked position.

16. The lock of claim 15 wherein the motor rotation of the cam to allow movement of the latch out of the locked position is a first direction of rotation, and wherein the motor rotation of the cam to preclude movement of the latch out of the locked position is a second direction of rotation, whereby the second direction of rotation is opposite of the first direction of rotation.

17. The lock of claim 15 further comprising a sensor for detecting one of the latch position and a knob position, whereby detection of one of the latch position and the knob position facilitates actuation of the motor to preclude movement of the latch out of the locked position.

18. A lock comprising:

a housing having a cavity and a knob cavity;

a latching assembly positioned within the cavity of the housing, the latching assembly movable between a locked and an unlocked position through electronic actuation;

a knob at least partially rotatably positionable within knob cavity the housing, and interfaceable with the latching assembly, the knob having at least one notch extending axially inwardly and further including at least one spring loaded ball directed axially outwardly, the at least one spring loaded ball cooperating with the knob cavity of the housing;

a lock driver coupled to the knob, a portion of the lock driver being outside of the housing;

a latch positioned within the housing, associated with the latching assembly and positionable between a first position within the at least one notch and a second position out of the at least one notch, the latch extending to the first position so as to at least partially rest within the at least one notch, wherein, when in a locked configuration, the latching assembly precludes the latch from moving between the first position to the second position, and when in an unlocked configuration, the latching assembly allows the latch to move away from the first position to the second position, and when in the unlocked configuration, movement of the knob facilitates the movement of the latch toward the second position.

19. The lock of claim 18 wherein the at least one spring loaded ball further comprises an opposing pair of spring loaded balls biased axially outwardly.

20. The lock of claim 18 wherein the knob cavity includes detents adapted to cooperate with the at least one spring loaded ball.

21. The lock of claim 18 further comprising a motor coupled to a cam, and positioned within the housing, whereupon actuation of the motor causes rotation of the cam, to, in turn, affect movement of the latch, to allow movement of the latch out of the locked position or to preclude movement of the latch out of the locked position.

22. The lock of claim 21 wherein the motor rotation of the cam to allow movement of the latch out of the locked position is a first direction of rotation, and wherein the motor rotation of the cam to preclude movement of the latch out of the locked position is a second direction of rotation, whereby the second direction of rotation is opposite of the first direction of rotation.

23. The lock of claim 21 further comprising a sensor for detecting one of the latch position and a knob position, whereby detection of one of the latch position and the knob position facilitates actuation of the motor to preclude movement of the latch out of the locked position.

24. A lock comprising:

a housing;

a latching assembly positioned within the housing, the latching assembly movable between a locked and an unlocked position through electronic actuation;

a knob at least partially positionable within the housing, and interfaceable with the latching assembly, the knob having at least one notch;

a lock driver coupled to the knob, a portion of the lock driver being outside of the housing;

a latch positioned within the housing, associated with the latching assembly and positionable between a first position within the at least one notch and a second position out of the at least one notch, the latch extending to the first position so as to at least partially rest within the at least one notch, wherein, when in a locked configuration, the latching assembly precludes the latch from moving between the first position to the second position, and when in an unlocked configuration, the latching assembly allows the latch to move away from the first position to the second position, and when in the unlocked configuration, movement of the knob facilitates the movement of the latch toward the second position; and a motor coupled to a cam, and positioned within the housing, whereupon actuation of the motor causes rotation of the cam, to, in turn, affect movement of the latch, to allow movement of the latch out of the locked position or to preclude movement of the latch out of the locked position.

25. The lock of claim 24 wherein the motor rotation of the cam to allow movement of the latch out of the locked position is a first direction of rotation, and wherein the motor rotation of the cam to preclude movement of the latch out of the locked position is a second direction of rotation, whereby the second direction of rotation is opposite of the first direction of rotation.

26. The lock of claim 24 further comprising a sensor for detecting one of the latch position and a knob position, whereby detection of one of the latch position and the knob position facilitates actuation of the motor to preclude movement of the latch out of the locked position.

27. A lock, comprising:

a housing;

a latching assembly positioned within the housing, the latching assembly movable between a locked and an unlocked position through electronic actuation;

a knob at least partially positionable within the housing, and interfaceable with the latching assembly, the knob having at least one notch;

a lock driver coupled to the knob, a portion of the lock driver being outside of the housing;

a latch positioned within the housing, associated with the latching assembly and positionable between a first position within the at least one notch and a second position out of the at least one notch, the latch being urged toward reaching the first position so as to at least partially rest within the at least one notch, wherein, when in a locked configuration, the latching assembly precludes the latch from moving between the first position to the second position, and when in an unlocked configuration, the latching assembly allows the latch to move away from the first position to the second position, and when in the unlocked configuration, movement of the knob facilitates the movement of the latch toward the second position.

28. The lock of claim 27, further comprising a motor coupled to a cam, and positioned within the housing, whereupon actuation of the motor causes rotation of the cam, to, in turn, affect movement of the latch, to allow movement of the latch out of the locked position or to preclude movement of the latch out of the locked position, wherein the motor rotation of the cam to allow movement of the latch out of the locked position is a first direction of rotation, and wherein the motor rotation of the cam to preclude movement of the latch out of the locked position is a second direction of rotation, whereby the second direction of rotation is opposite of the first direction of rotation.

29. The lock of claim 28 further comprising a sensor for detecting one of the latch position and a knob position, whereby detection of one of the latch position and the knob position facilitates actuation of the motor to preclude movement of the latch out of the locked position.

30. A keyless lock on a cabinet, door or drawer that provides ingress and no egress; comprising:

a housing;

a latching assembly positioned within the housing, the latching assembly movable between a locked and an unlocked position through electronic actuation;

a knob at least partially positionable within the housing, and interfaceable with the latching assembly, the knob having at least one notch;

a lock driver coupled to the knob, a portion of the lock driver being outside of the housing;

a latch positioned within the housing, associated with the latching assembly and positionable between a first position within the at least one notch and a second position out of the at least one notch, the latch extending to the first position so as to at least partially rest within the at least one notch, wherein, when in a locked configuration, the latching assembly precludes the latch from moving between the first position to the second position, and when in an unlocked configuration, the latching assembly allows the latch to move away from the first position to the second position, and when in the unlocked configuration, movement of the knob facilitates the movement of the latch toward the second position.

31. The lock of claim 30, further comprising a motor coupled to a cam, and positioned within the housing, whereupon actuation of the motor causes rotation of the cam, to, in turn, affect movement of the latch, to allow movement of the latch out of the locked position or to preclude movement of the latch out of the locked position, wherein the motor rotation of the cam to allow movement of the latch out of the locked position is a first direction of rotation, and wherein the motor rotation of the cam to preclude movement of the latch out of the locked position is a second direction of rotation, whereby the second direction of rotation is opposite of the first direction of rotation.

32. The lock of claim 31 further comprising a sensor for detecting one of the latch position and a knob position, whereby detection of one of the latch position and the knob position facilitates actuation of the motor to preclude movement of the latch out of the locked position.

* * * * *